(12) United States Patent
Morota et al.

(10) Patent No.: US 11,188,360 B2
(45) Date of Patent: Nov. 30, 2021

(54) INFORMATION PROCESSING APPARATUS AND HINT PROVISION METHOD

(71) Applicant: NTT DOCOMO, INC., Chiyoda-ku (JP)

(72) Inventors: Satoru Morota, Chiyoda-ku (JP); Ryou Babazono, Chiyoda-ku (JP); Keiichi Ochiai, Chiyoda-ku (JP); Kouhei Senkawa, Chiyoda-ku (JP); Ryoko Hayashi, Chiyoda-ku (JP); Koichi Moriyama, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/277,112

(22) PCT Filed: Aug. 26, 2019

(86) PCT No.: PCT/JP2019/033242
§ 371 (c)(1),
(2) Date: Mar. 17, 2021

(87) PCT Pub. No.: WO2020/059428
PCT Pub. Date: Mar. 26, 2020

(65) Prior Publication Data
US 2021/0271498 A1  Sep. 2, 2021

(30) Foreign Application Priority Data

Sep. 21, 2018 (JP) .............................. JP2018-177263

(51) Int. Cl.
*G06F 9/451* (2018.01)
*G06F 3/0482* (2013.01)

(52) U.S. Cl.
CPC ............ *G06F 9/453* (2018.02); *G06F 3/0482* (2013.01)

(58) Field of Classification Search
CPC ........................... G06F 3/048–05; G06F 9/453
See application file for complete search history.

(56) References Cited

U.S. PATENT DOCUMENTS 10,977,663 B1 * 4/2021 Liao ..................... G06Q 30/016
2010/0333022 A1 12/2010 Inoue et al.
(Continued)

FOREIGN PATENT DOCUMENTS

| JP | 2007-228318 A | 9/2007 |
| JP | 2010-192004 A | 9/2010 |
| JP | 2011-96191 A | 5/2011 |

OTHER PUBLICATIONS

International Search Report dated Nov. 5, 2019 in PCT/JP2019/033242 filed on Aug. 26, 2019, 1 page.

*Primary Examiner* — Daniel Rodriguez
(74) *Attorney, Agent, or Firm* — Oblon, McClelland, Maier & Neustadt, L.L.P.

(57) ABSTRACT

An information processing apparatus includes a log acquirer, a first estimation model, a finder and a hint display controller. The log acquirer acquires a log at occurrence of a predetermined event. The log includes one or both of a user's input operation history and an application history. The first estimation model calculates, based on the input log, a first evaluation value for each of a plurality of hint items that are obtained by separating a plurality of hints into categories. Each of the plurality of hints is prepared as a usage hint for the user. The first evaluation value represents likelihood of each of the plurality of hint items is a hint item that includes a hint sought by the user. The finder finds, from among the plurality of hint items, one or more hint items, in each of which the first evaluation value is a first predetermined value or greater. The hint display controller displays, on a display device, from among the plurality of hint items, (Continued)

| HINT ID | HINT ITEM | SUB-ITEM | CONTENTS | DISPLAY EVENT | DISPLAY CONDITION |
|---|---|---|---|---|---|
| HINT0.0 | — | — | — | Launch of assistance application | First evaluation value is 70 or greater |
| HINT1.0 | Email | Set up Email | Hint on "Setup Email" | × × × ··· | △ △ △ ··· |
| HINT1.1 |  | Create new Email | Hint on "Create new Email" | × × × ··· | △ △ △ ··· |
| ⋮ |  | ⋮ | ⋮ | ⋮ | ⋮ |
| HINT1.i |  | How to use Decome | Hint on "How to use Decome" | × × × ··· | △ △ △ ··· |
| HINT2.0 | Chat | Set up chat | Hint on "Set up chat" | × × × ··· | △ △ △ ··· |
| ⋮ |  | ⋮ | ⋮ | ⋮ | ⋮ |
| HINT2.j |  | Voice call | Hint on "Voice call" | × × × ··· | △ △ △ ··· |
| HINT3.0 | Phone | Voice mail | Hint on "Voice mail" | × × × ··· | △ △ △ ··· |
| ⋮ |  | ⋮ | ⋮ | ⋮ | ⋮ |
| HINT3.k |  | Call forwarding | Hint on "Call forwarding" | × × × ··· | △ △ △ ··· |
| ⋮ | ⋮ | ⋮ | ⋮ | ⋮ | ⋮ |
| HINTm.0 | Wi-Fi | Set up Wi-Fi | Hint on "Set up Wi-Fi" | × × × ··· | △ △ △ ··· |
| ⋮ |  | ⋮ | ⋮ | ⋮ | ⋮ |
| HINTm.n |  | Public Wi-Fi | Hint on "Public Wi-Fi" | × × × ··· | △ △ △ ··· |

DBFa the one or more hint items, in each of which the first evaluation value is the first predetermined value or greater.

13 Claims, 24 Drawing Sheets

(56) References Cited

U.S. PATENT DOCUMENTS

| | | | |
|---|---|---|---|
| 2013/0144890 A1* | 6/2013 | Liu | G06F 16/35 |
| | | | 707/749 |
| 2013/0151514 A1* | 6/2013 | Gionis | G06F 16/951 |
| | | | 707/730 |
| 2018/0129732 A1* | 5/2018 | Pelleg | G06F 16/3344 |
| 2018/0280802 A1* | 10/2018 | Stroud | A63F 13/63 |
| 2019/0179649 A1* | 6/2019 | Kadambala | G06N 20/00 |
| 2020/0035112 A1* | 1/2020 | Delaney | G06F 16/24578 |

\* cited by examiner

FIG. 2

| Log | Input operation history | ·Start up of the smartphone<br>·Reboot of the smartphone<br>·Initialization of the smartphone<br>·Wake-up with authentication<br>·Wake-up without authentication<br>·Lock/unlock<br>·Launch/quit of applications<br>·Charge of the battery<br>·Viewing files<br>·Network connection to a cellular<br>·<br>·<br>·<br>· |
|---|---|---|
| | Application history | ·Text entry/deletion<br>·Copy/cut/paste<br>·Drawing<br>·Table creation<br>·Editing address book<br>·Saving<br>·History of screens<br>·Resizing screens<br>·Search history<br>·Time stamps of updated applications<br>·Time stamps of updated operating system |

FIG. 5

| HINT ID | HINT ITEM | SUB-ITEM | CONTENTS | DISPLAY EVENT | DISPLAY CONDITION |
|---|---|---|---|---|---|
| HINT0.0 | — | — | — | Launch of assistance application | First evaluation value is 70 or greater |
| HINT1.0 | Email | Set up Email | Hint on "Setup Email" | x x x ... | △△△ ... |
| HINT1.1 | | Create new Email | Hint on "Create new Email" | x x x ... | △△△ ... |
| ... | | ... | ... | ... | ... |
| HINT1.i | | How to use Decome | Hint on "How to use Decome" | x x x ... | △△△ ... |
| HINT2.0 | Chat | Set up chat | Hint on "Set up chat" | x x x ... | △△△ ... |
| ... | | ... | ... | ... | ... |
| HINT2.j | | Voice call | Hint on "Voice call" | x x x ... | △△△ ... |
| HINT3.0 | Phone | Voice mail | Hint on "Voice mail" | x x x ... | △△△ ... |
| ... | | ... | ... | ... | ... |
| HINT3.k | | Call forwarding | Hint on "Call forwarding" | x x x ... | △△△ ... |
| HINTm.0 | Wi-Fi | Set up Wi-Fi | Hint on "Set up Wi-Fi" | x x x ... | △△△ ... |
| ... | | ... | ... | ... | ... |
| HINTm.n | | Public Wi-Fi | Hint on "Public Wi-Fi" | x x x ... | △△△ ... |

DBFa

DISPLAY SCREEN D1

DISPLAY SCREEN D2

DISPLAY SCREEN D3

DISPLAY SCREEN D0

DISPLAY SCREEN D1

DISPLAY SCREEN D2

INFORMATION PROCESSING APPARATUS AND HINT PROVISION METHOD

TECHNICAL FIELD

The present invention relates to information processing apparatuses and relates to hint provision methods.

BACKGROUND ART

A help information provision method has been proposed to provide useful help information to a user of an application (e.g., Patent Document 1). In such a help information provision method, a help information providing apparatus is connected to a user apparatus that is operated by a user of an application via a network, and provides help information to the user apparatus. For example, the help information providing apparatus determines whether the user repeats a certain input operation based on an operation history of the application and a user's input history. If the help information providing apparatus determines that the input operation is repeated, the help information providing apparatus searches for help information corresponding to the repeated input operation, and provides the information to the user apparatus.

RELATED ART DOCUMENT

Patent Document

Japanese Patent Application Laid-Open Publication No. 2011-96191

SUMMARY OF THE INVENTION

Problem to be Solved by the Invention

However, in the conventional method of displaying help information corresponding to a certain input operation, unless the input operation is repeated, no hints such as help information are provided. For this reason, the conventional information processing apparatus is not user-friendly.

Means of Solving the Problems

To achieve the above object, an information processing apparatus according to an aspect of the present invention is an information processing apparatus and includes a log acquirer configured to acquire a log at occurrence of a predetermined event, when the log including one or both of a user's input operation history and an application history, a first estimation model configured to calculate, based on the input log, a first evaluation value for each of a plurality of hint items that are obtained by separating a plurality of hints into categories, when each of the plurality of hints being prepared as a usage hint for the user, and the first evaluation value representing likelihood of each of the plurality of hint items being a hint item that includes a hint sought by the user, a finder configured to find, from among the plurality of hint items, one or more hint items, in each of which the first evaluation value is a first predetermined value or greater, and a hint display controller configured to display, on a display device, from among the plurality of hint items, the one or more hint items, in each of which the first evaluation value is the first predetermined value or greater.

Effect of the Invention

According to the present invention, usability of an information processing apparatus is improved.

BRIEF DESCRIPTION OF THE DRAWINGS

FIG. 2 is explanatory diagram of an example of a log to be input into a first estimation model.

FIG. 5 is an explanatory diagram of an example of a database file.

MODES FOR CARRYING OUT THE INVENTION

1. First Embodiment

Figure 1:
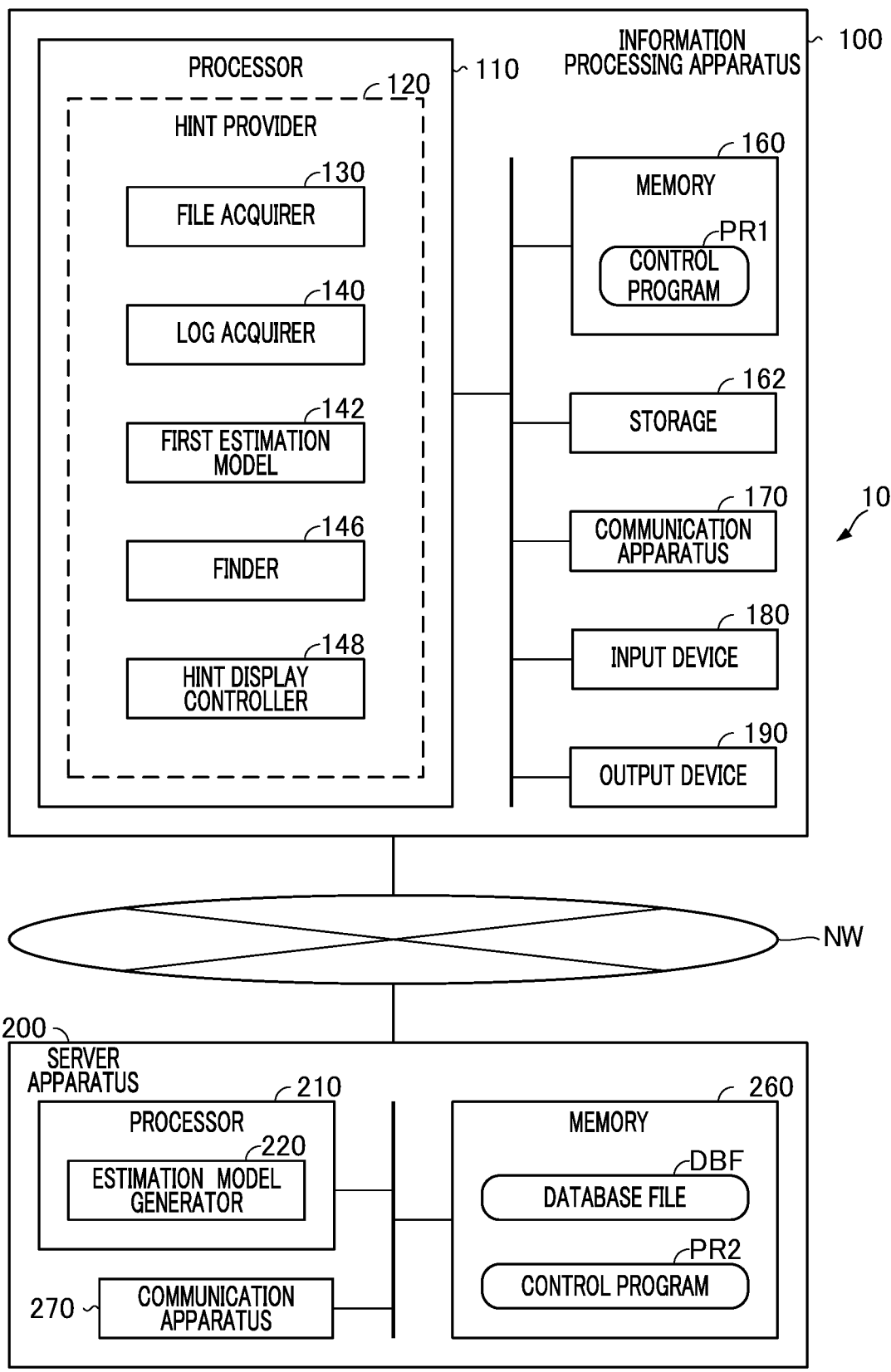
FIG. 1 is a block diagram showing the overall configuration of the system according to the first embodiment of the present invention.

FIG. 1 is a block diagram showing the overall configuration of a system 10 according to a first embodiment according to the present invention. As shown in FIG. 1, the system 10 includes an information processing apparatus 100 carried by a user, a network NW, and a server apparatus 200. In the following description, an example is given in which the information processing apparatus 100 is a smartphone. However, any information processing apparatus may be employed as the information processing apparatus 100. Examples of the information processing apparatus 100 include a mobile information apparatus, such as a personal computer, a portable information terminal, such as a laptop computer, a wearable terminal, and a tablet terminal. The network NW is a telecommunication line, such as a mobile communication network, and includes one or both of a wired network and a wireless network.

The information processing apparatus 100 is realized by a computer system that includes a processor 110, a memory 160, a storage 162, a communication apparatus 170, an input device 180 and an output device 190. Each component of the information processing apparatus 100 is connected to another component by a single bus or multiple buses for communicating information. The term "apparatus" in this specification may be replaced to another term, such as circuit, device or unit. Each component of the information processing apparatus 100 may be composed of a single apparatus or a plurality of apparatuses. Some components of the information processing apparatus 100 may be omitted.

The processor 110 controls the entire information processing apparatus 100, and is composed of a single chip or multiple chips. The processor 110 is configured to have a Central Processing Unit (CPU) that includes an interface for peripheral devices, an arithmetic unit, registers, and the like. Some or all of the functions of the processor 110 are realized by hardware, such as a Digital Signal Processor (DSP), an Application Specific Integrated Circuit (ASIC), a Programmable Logic Apparatus (PLD), a Field Programmable Gate Array (FPGA). The processor 110 executes a variety of processes in parallel or sequentially.

The processor 110 acts as a hint provider 120 by reading a control program PR1 from the memory 160 and executing the program. The control program PR1 may be a program that is transmitted from another apparatus via the network NW. The hint provider 120 provides usage hints (tips) of the information processing apparatus 100 to a user. Examples of functional blocks of the hint provider 120 shown in FIG. 1 include a file acquirer 130, a log acquirer 140, a first estimation model 142, a finder 146, and a hint display controller 148. That is, the information processing apparatus 100 includes the file acquirer 130, the log acquirer 140, the first estimation model 142, the finder 146, and the hint display controller 148.

The file acquirer 130 obtains a database file DBF from the server apparatus 200 via the network NW The database file DBF includes information about usage hints of the information processing apparatus 100 that are prepared for the user. The file acquirer 130 stores, in the memory 160 or storage 162, the database file DBF acquired from the server apparatus 200. For example, a plurality of hints are classified into a plurality of hint items, and each of the hints is linked with a hint ID for identifying each hint. The result of the linking is registered in the database file DBF.

In other words, each of the hint items includes one or more hints. As a hint item ID for identifying each hint item including one or more hints, there may be used a portion of the hint ID (e.g., "HINTm" of "HINTm.n" in the hint ID shown in FIG. 5), or may be used a predetermined hint ID from among hint IDs included in a hint item. Examples of the hint item IDs for identifying each hint item are not limited thereto.

The log acquirer 140 acquires a log at occurrence of a predetermined event. The log includes one or both of the user's input operation history and the application history. Examples of the predetermined event include launching a predetermined application. Examples of the predetermined application include (a1) an application used for displaying a button for a phone number of a call center, (a2) a button for the call center, and (a3) a button for a link screen to a customer support page. Hereinafter, the application for displaying the labeled (a1) to (a3) and other similar buttons is referred to as an assistance application. When the assistance application is launched, the log acquirer 140 acquires from the memory 160 a log recorded in the period from a time at which the assistance application is launched to a given time. In the memory 160, a log that includes the input operation history of the information processing apparatus 100 and the application history is stored. An example of the log will be described referring to FIG. 2. The predetermined application is not limited to the assistance application.

The first estimation model 142 calculates, based on the input log, a first evaluation value for each of the hint items that are obtained by separating a plurality of hints into categories. Here, the plurality of hints are prepared as usage hints for the user. The first evaluation value represents likelihood of whether each of the hint items is a hint item that includes one or more hints sought by the user. Specifically, the first estimation model 142 calculates a first evaluation value of each of the hint items, which are registered in the database file DBF stored in the memory 160 or the storage 162, by use of the log acquired by the log acquirer 140. Then, the first estimation model 142 links each of the hint items with the corresponding first evaluation value, and stores the result of the linking in the memory 160 or the storage 162. Specifically, the first estimation model 142 links a first evaluation value of each of the hint items with the corresponding hint item ID, and stores the result of the linking in the memory 160 or the storage 162. Alternatively, the first estimation model 142 may link a first evaluation value of each of the hint items with the corresponding hint item ID, and may notify the finder 146 of the result of the linking.

The finder 146 finds one or more hint items, in each of which a first evaluation value is a first predetermined value or greater, from among the hint items. Specifically, the finder 146 finds, from the first evaluation values calculated by the first estimation model 142, one or more first evaluation value, each of which is the first predetermined value or greater. Then the finder 146 stores in the memory 160 or the storage 162 the hint item IDs that are linked with the respective first evaluation values, each of which is the first predetermined value or greater. Alternatively, the finder 146 may notify the hint display controller 148 of the hint item IDs.

The hint display controller 148 displays on the output device 190 one or more hint items, in each of which the first evaluation value is the first predetermined value or greater, from among the hint items. Specifically, the hint display controller 148 searches the database file DBF for one or more hint items. Each of the hint items is linked with the corresponding hint item ID (i.e., the hint item ID found by the finder 146). The hint item ID is linked with the corresponding first evaluation value which is the first predetermined value or greater. Then, the hint display controller 148 displays the found hint items on the output device. That is, the hint provider 120 estimates one or more hint items, each of which includes hints sought by the user, based on the log, and displays the hint items with high likelihood of the estimation result. Alternatively, the hint display controller 148 may display on the output device one or more hint items, in each of which the first evaluation value is the first predetermined value or greater, in the order from highest to lowest of first evaluation value.

The memory 160 is one of a recording medium readable by the processor 110, and stores programs that include a control program PR1 executed by the processor 110, and a variety of data used by the processor 110. Examples of the memory 160 include a read only memory (ROM), an erasable programmable ROM (EPROM), an Electrically Erasable Programmable ROM (EEPROM), and Random Access Memory (RAM). The memory 160 may be configured by at least one of these. The memory 160 may be referred to as a register, a cache or a main memory.

The storage 162 is a recording medium readable by the processor 110. Examples of the storage 162 include an optical disk such as a Compact Disc ROM (CD-ROM), a hard disk drive, a flexible disk, a magnetic optical disk (e.g., a compact disk, a digital versatile disk, a Blu-ray (registered trademark) disk), a smart card, a flash memory (e.g., a card, a stick key drive), a floppy (registered trademark) disk, and a magnetic strip. The storage 162 may be configured by at least one of these. The storage 162 may be referred to as an auxiliary storage apparatus. There may be used, as a recording medium, a database or a server including one or both of the memory 160 and the storage 162.

The communication apparatus 170 is configured by hardware devices (a transmitter and a receiver) communicable with other apparatuses via the network NW. The communication apparatus 170 is also referred to as a network device, a network controller, a network card, a communication module, and the like. The communication apparatus 170 may include a high-frequency switch, a duplexer, a filter, a frequency synthesizer, and the like, to realize one or both Frequency Division Duplexing (FDD) and Time Division Duplexing (TDD).

The input device 180 receives an input operation, and is configured to have a keyboard, a mouse, a microphone, a switch, a button, a sensor or the like. Examples of an input operation received by the input device 180 include inputting symbols, such as numbers and letters, to the processor 110 and selecting an icon displayed on the display of the information processing apparatus 100. It is preferable that the input device 180 be a touch panel, which detects a touch on the display of the information processing apparatus 100. The input device 180 may include a plurality of operating elements operable by the user.

The output device 190 is a display, and it outputs data. The output device 190 is an example of a display apparatus, and displays one or more hint items and the like under control of the processor 110. It is preferable that the output device 190 be a display panel, such as a liquid crystal display panel and an organic electroluminescent display panel. The input device 180 and the output device 190 may be formed as one piece, such as a touch panel. The output device 190 may include a speaker, an LED (Light Emitting Diode) lamp, and the like.

The server apparatus 200 collects information on inquiries from users received at a call center. Based on this information, the first estimation model 142 is generated by the server apparatus 200, thereby estimating one or more first evaluation values, each of hint items of which includes a hint sought by the user.

The server apparatus 200 includes a processor 210, a memory 260, and a communication apparatus 270, for example. The processor 210 controls the entire server apparatus 200 and is configured in the same manner as the processor 110 of the information processing apparatus 100 described above. The processor 210 acts as an estimation model generator 220 by reading a control program PR2 from the memory 260 and executing the control program PR2. The control program PR2 may be a program that is transmitted from another apparatus via the network NW.

The estimation model generator 220 generates a first estimation model 142 that estimates one or more first evaluation values, each of which is linked with the corresponding hint item, by use of machine learning. In the machine learning, the following inputs (i) and (ii) are made:
(i) logs of a plurality of the information processing apparatuses 100 (e.g., smartphones) carried by users who have made inquiries to the call center; and
(ii) logs of the call center.
Examples of the logs of the call center include descriptions of the inquiries and history of responses to the inquiries.

The first estimation model 142 generated by the estimation model generator 220 is transferred to the information processing apparatus 100 in program form executable by the first estimation model 142. Thereafter, the control program PR1 is executed, thereby running a program for the first estimation model 142. Accordingly, the first estimation model 142 is realized as a functional block of the hint provider 120. The program for the first estimation model 142 may be included in the control program PR1.

The memory 260 is a recording device readable by the processor 210. The memory 260 stores (i) programs that include the control program PR2 executed by the processor 210, (ii) a database file DBF, and (iii) a variety of data used by the processor 210. The memory 260 may be configured by at least one of a ROM, EPROM, EEPROM, RAM, or the like, as well as the memory 160 described above.

The communication apparatus 270 is configured by hardware devices (a transmitter and a receiver) communicable with other apparatuses via the network NW. The communication apparatus 270 has the same configuration as the communication apparatus 170 described above. The communication apparatus 270 communicates with another apparatus, for example, the information processing apparatus 100, via the network NW.

The configuration of the information processing apparatus 100 and the server apparatus 200 is not limited to the example shown in FIG. 1. For example, the server apparatus 200 may have a storage as well as the information processing apparatus 100. In this case, the database file DBF and the like may be stored in the storage. The file acquirer 130 may be omitted from the information processing apparatus 100.

FIG. 2 is an explanatory diagram of an example of a log to be input to the first estimation model 142. The log includes a user's input operation history and an application history. Examples of the input operation history include at least one of the following: start-up of a smartphone, reboot of the smartphone, initialization of the smartphone, wake-up with authentication, wake-up without authentication, lock/ unlock, launch/quit of applications, charge of a battery, viewing files, network connection to a cellular, network connection with Wi-Fi (registered trademark), log in/log out of a variety of services, making/receiving phone calls, receiving/sending Emails, selection of applications to be activated, installation/uninstallation of applications, setup of spam filters, editing the home screen of the smartphone, network settings, setting functions of the smartphone, and execution of backups. FIG. 2 illustrates some of the input operation history.

The application history includes records made by each application. Examples of the application history include at least one of the following: text entry/deletion, copy/cut/ paste, drawing, table creation, editing address book, saving, history of screens, resizing screens, search history, time stamps of updated applications, and time stamps of updated operating system.

The items included in the log are not limited to the examples shown in FIG. 2. For example, the input operation history may include only items other than the items shown in FIG. 2, or may include items other than the items shown in FIG. 2 in addition to the items shown in FIG. 2. Similarly, the application history may include only items other than those shown in FIG. 2, or may include items shown in FIG. 2 in addition to the items shown in FIG. 2. The operation history may not be distinguished from the application history.

Figure 3:
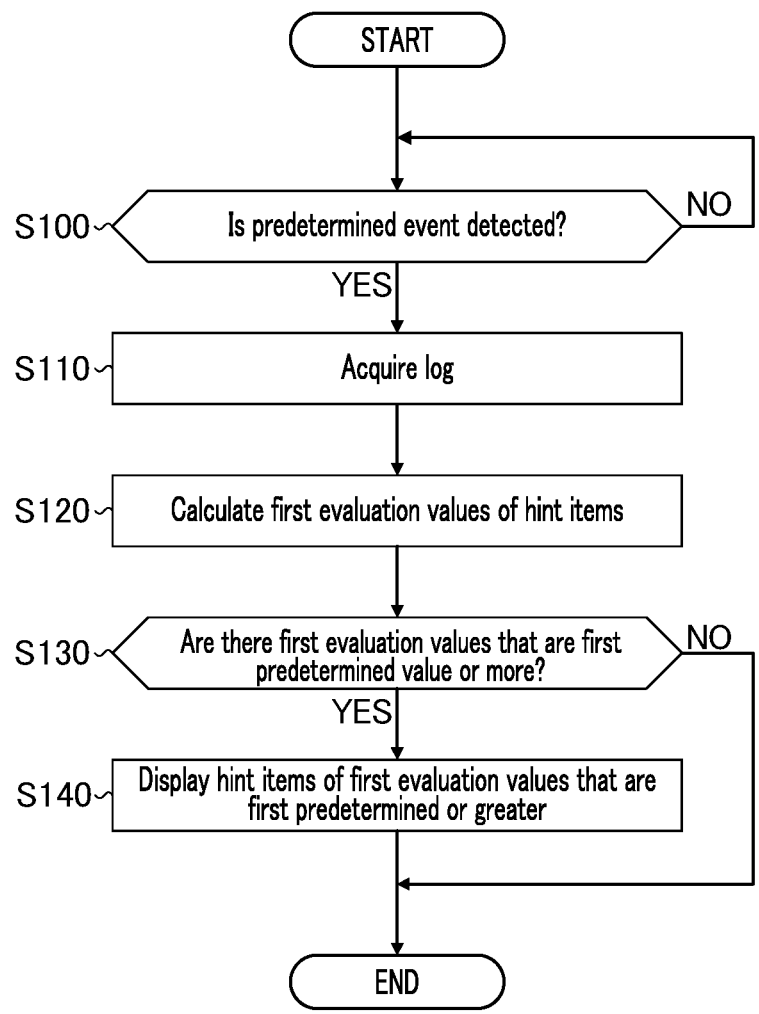
FIG. 3 is a flowchart showing an example of operation of the information processing apparatus shown in FIG. 1.

FIG. 3 is a flowchart showing an example of an operation of the information processing apparatus 100 shown in FIG. 1. The operation shown in FIG. 3 is an example of a hint provision method. Furthermore, the operation shown in FIG. 3 is an example of the operation of the information processing apparatus 100 after the database file DBF is acquired from the server apparatus 200.

In step S100, the processor 110 determines whether the predetermined event is detected. For example, if the predetermined event is the launch of the assistance application, the processor 110 determines whether the assistance application is launched. If the predetermined event is detected, the operation of the information processing apparatus 100 is moved to step S110. In contrast, if the predetermined event is not detected, the operation of the information processing apparatus 100 is returned to step S100. That is, the information processing apparatus 100 waits for the execution of step S110 until the predetermined event is detected.

In step S110, the processor 110 acts as the log acquirer 140 and acquires the log. For example, the log acquirer 140 obtains from the memory 160 the log recorded in a period from a time in which the predetermined event is detected to a predetermined time. It is to be noted that the information processing apparatus 100 makes a continuous recording of the log. Therefore, the log up to the current time is stored in the memory 160.

Next, in step S120, the processor 110 acts as the first estimation model 142, and calculates a first evaluation value for each of the hint items. Specifically, the first estimation model 142 calculates a first evaluation value for each of the hint items registered in the database file DBF, by use of the log acquired in step S110.

Next, in step S130, the processor 110 acts as the finder 146, and finds one or more first evaluation values, each of which is the first predetermined value or greater, from among the first evaluation values calculated in step S120. For example, if the first predetermined value refers to 70(%), the finder 146 finds one or more first evaluation values, each of which is 70(%) or greater, from among the first evaluation values calculated in step S120.

If there are one or more first evaluation values, each of which is the first predetermined value or greater, the finder 146 stores in the memory 160 or the storage 162 one or more hint item IDs that are linked with the respective first evaluation values, each of which is the first predetermined value or greater. Thereafter, the operation of the information processing apparatus 100 is moved to step S140. In contrast, if there are no first evaluation values, the process of providing a hint in response to the predetermined event ends.

In step S140, the processor 110 acts as the hint display controller 148. The processor 110 finds one or more hint items, each of which is linked with the corresponding first evaluation value that is the first predetermined value or greater, and displays the result of the finding. Specifically, the hint display controller 148 searches the database file DBF for one or more hint items, each of which is linked with the corresponding hint item ID (i.e., the hint item ID found in step S130). The hint item ID is linked with the corresponding first evaluation value that is the first predetermined value or greater. Then, the hint display controller 148 displays the found hint item on the output device. Alternatively, the hint display controller 148 may display one or more hint items on the output device, in each of which the first evaluation value is the first predetermined value or greater, in the order from highest to lowest of the first evaluation value.

In the operation shown in FIG. 3, if there are one or more hint items, in each of which the first evaluation value is the first predetermined value or greater, the hint items are displayed. Here, the first evaluation value represents likelihood of whether each of the hint items is a hint item including one or more hints sought by the user. In this case, the user is able to find with ease hint items the user would like to know, as compared with a case in which all of the hint items registered in the database file DBF are displayed. Furthermore, if the hint items, in each of which the first evaluation value is the first predetermined value or greater, are displayed in order from highest to lowest of the first evaluation value, the user is able to find with ease the hint items the user would like to know, as compared with a case in which the hint items are displayed unordered.

It is difficult to make a direct identification of a single hint sought by the user. However, since a hint item includes one or more hints, estimating a hint item including a hint sought by the user is easier than making a direct identification of a single hint. In addition, in a case in which a plurality of hints sought by the user are estimated, and the detailed contents thereof are displayed, the hints sought by the user are not always displayed on the top of the list of the hints. The farther the hint sought by the user is from the top of the list, the more difficult it is for the user to find the hint the user would like to know. In contrast, in the operation shown in FIG. 3, a plurality of hint items are displayed. Accordingly, the hint items can be displayed within one screen, even if a hint item including a hint sought by the user is not displayed at the top of the list. Accordingly, the hint item sought by the user is found with ease. The usability of information processing apparatus 100 is improved.

In the first embodiment, the information processing apparatus 100 includes the log acquirer 140, the first estimation model 142, the finder 146, and the hint display controller 148. The log acquirer 140 obtains a log including one or both of the user's input operation history and the application history at the predetermined opportunity. The first estimation model 142 calculates, based on the input log, a first evaluation value for each of the hint items that are obtained by separating a plurality of hints into categories. Here, the plurality of hints are prepared as usage hints for the user. The first evaluation value represents likelihood of whether each of the hint items is a hint item including one or more hints sought by the user. The finder 146 finds one or more hint items, in each of which the first evaluation value is the first predetermined value or greater, from among the hint items. The hint display controller 148 displays on the output device one or more hint items, in each of which the first evaluation value is the first predetermined value or greater, from among the hint items.

In other words, if there are one or more first evaluation values, each of which is the first predetermined value or greater, from among the first evaluation values calculated by the first estimation model 142 that inputs the log, the information processing apparatus 100 displays the first evaluation values. Since there is displayed one or more hint items with high likelihood of each of the hint items being a hint item including one or more hints sought by the user, the user is able to find with ease a hint item the user would like to know. Thus, in the first embodiment, the usability of information processing apparatus 100 is improved.

2. Second Embodiment

The main point of difference between the first and the second embodiments is as follows. Each of the hint items are further separated into categories. A second evaluation value is calculated for each of sub-items that are included in a hint item. Here, the second evaluation value represents likelihood of whether each of the sub-items is a sub-item including one or more hints sought by the user.

Figure 4:
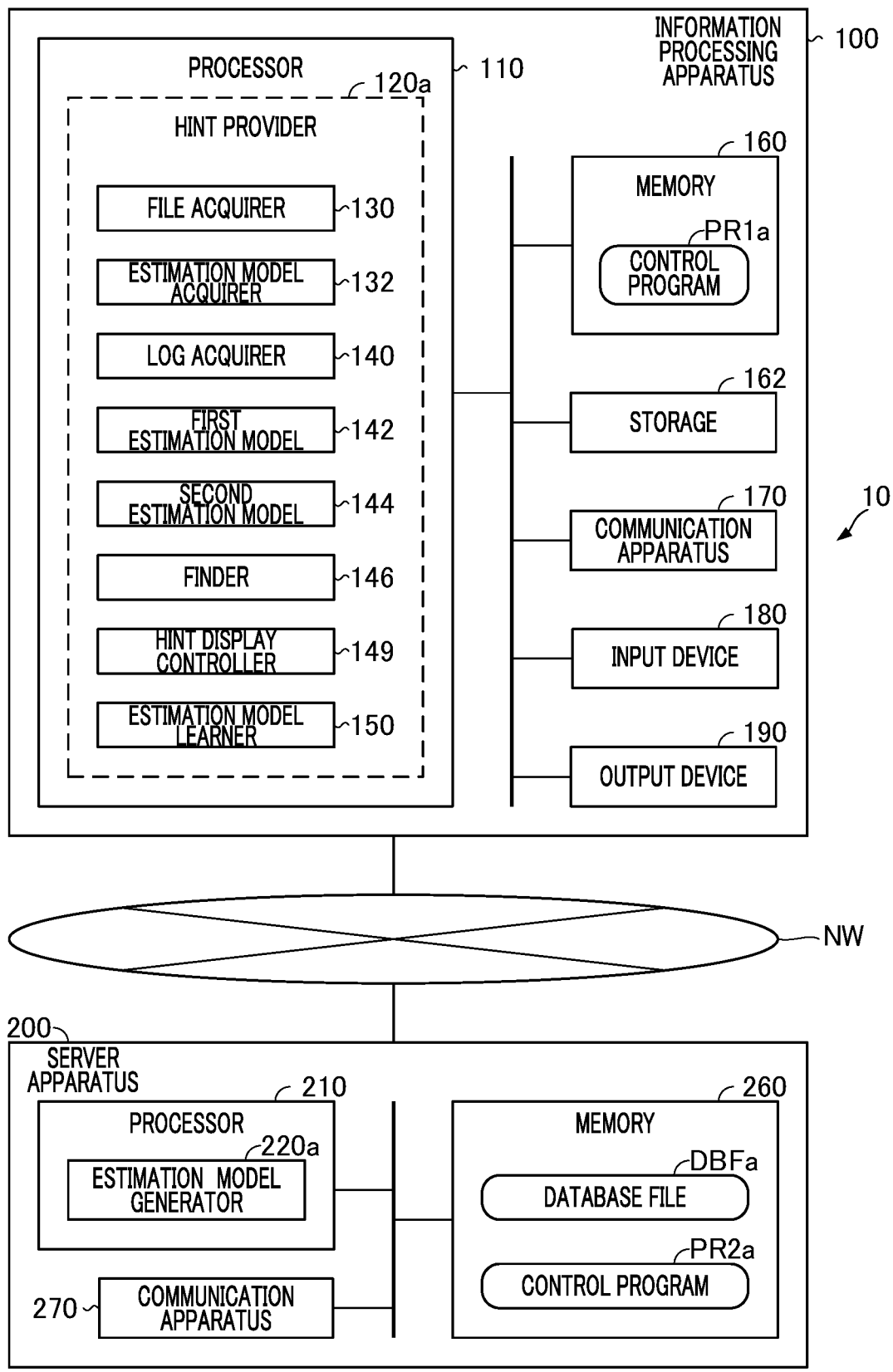
FIG. 4 is a block diagram showing the overall configuration of the system according to a second embodiment of the present invention.

FIG. 4 is a block diagram showing the overall configuration of the system 10 in the second embodiment according to the present invention. The same or similar components described in FIGS. 1 to 3 will be denoted by the same reference signs, and detailed description will be omitted. The system 10 shown in FIG. 4 has the same configuration as that shown in FIG. 1. The system 10 includes an information processing apparatus 100, a network NW and a server apparatus 200.

The information processing apparatus 100 shown in FIG. 4 has the same configuration as the information processing apparatus 100 shown in FIG. 1. The information processing apparatus 100 is realized by a computer system that includes a processor 110, a memory 160, a storage 162, a communication apparatus 170, an input device 180 and an output device 190. However, the control program PR1a stored in the memory 160 differs from the control program PR1 shown in FIG. 1. Components of the information processing apparatus 100 are interconnected by a single bus or multiple buses for communicating information. Each component of the information processing apparatus 100 may be composed of a single apparatus or plurality of apparatuses. Some components of the information processing apparatus 100 may be omitted.

The processor 110 shown in FIG. 4 is the same as, or similar to, that shown in FIG. 1, except that the control program PR1a is executed instead of the control program PR1 shown in FIG. 1. For example, the processor 110 acts as a hint provider 120a by reading the control program PR1a from the memory 160 and executing the program.

The hint provider 120a provides usage hints from the information processing apparatus 100 to the user, as well as the hint provider 120 shown in FIG. 1. Specifically, the hint provider 120a estimates, based on the log, one or more hint items including hints sought by the user, and displays the hint items with high likelihood of the estimation result. Examples of functional blocks of the hint provider 120a shown in FIG. 4 include a file acquirer 130, an estimation model acquirer 132, a log acquirer 140, a first estimation model 142, a second estimation model 144, a finder 146, a hint display controller 149 and an estimation model learner 150. That is, the information processing apparatus 100 includes the file acquirer 130, the estimation model acquirer 132, the log acquirer 140, the first estimation model 142, the second estimation model 144, the finder 146, the hint display controller 149 and the estimation model learner 150.

The file acquirer 130, the log acquirer 140, the first estimation model 142 and the finder 146, shown in FIG. 4 are the same as those shown in FIG. 1. However, a database file DBFa acquired by the file acquirer 130 differs from the database file DBF shown in FIG. 1. As shown in FIG. 5, each of the hint items is separated into categories, thereby obtaining sub-items by hint item. Each of the sub-items is linked with the corresponding hint ID. The result of the linking is registered in the database file DBFa. In the database file DBFa, information on a portion of the hint ID is used as the hint item ID, as shown in FIG. 5.

In FIG. 4, description of the differences between the hint provider 120a and the hint provider 120 shown in FIG. 1 will be explained for the estimation model acquirer 132, the second estimation model 144, the hint display controller 149, and the estimation model learner 150.

The estimation model acquirer 132 is an example of a model acquirer that acquires the first estimation model 142 from the server apparatus 200 which generates the first estimation model 142. The estimation model acquirer 132 acquires the first estimation model 142 and the second estimation model 144 from the server apparatus 200. Specifically, the estimation model acquirer 132 acquires programs for the first estimation model 142 and the second estimation model 144, from the server apparatus 200 via the network NW.

Thereafter, the program for the first estimation model 142 is read out and executed by the control program PR1a, thereby realizing the first estimation model 142 as a functional block of the hint provider 120a. Similarly, the program for the second estimation model 144 is read out and executed by the control program PR1a, thereby realizing the second estimation model 144 as a functional block of the hint provider 120a. The programs for the first estimation model 142 and the second estimation model 144 may be included in the control program PR1a.

If the server apparatus 200 updates the first estimation model 142 and the second estimation model 144, the estimation model acquirer 132 may acquire both again from the server apparatus 200. In this case, the information processing apparatus 100 can calculate the first and second estimation values by use of the latest first estimation model 142 and the latest second estimation model 144. In addition, the estimation model acquirer 132 may confirm with the server apparatus 200 whether the first estimation model 142 and the second estimation model 144 have been updated, at regular intervals, or may receive a notice of completion of update of the first estimation model 142 and the second estimation model 144 from the server apparatus 200. Alternatively, the estimation model acquirer 132 may confirm with the server apparatus 200 whether the first estimation model 142 and the second estimation model 144 have been updated when the assistance application or the like is updated.

The second estimation model 144 calculates, based on at least the input log, a second evaluation value for each of the sub-items that are obtained by further separating each of the hint items into categories. Here, the second evaluation value represents likelihood of whether each of the sub-items is a sub-item that includes one or more hints sought by the user. For example, the second estimation model 144 calculates a second evaluation value for each of the sub-items registered in the database file DBFa, by use of the log acquired by the log acquirer 140. Thereafter, the second estimation model 144 links with the corresponding hint ID each of the second evaluation values of sub-items included in a hint item that is selected by the user. The second estimation model 144 then stores the result of the linking in the memory 160 or the storage 162. Alternatively, the second estimation model 144 may link with the corresponding hint ID each of the second evaluation values, and may notify the hint display controller 149 of the result of the linking.

Similarly to the hint display controller 148 shown in FIG. 1, the hint display controller 149 displays on the output device one or more hint items, in each of which the first evaluation value is the first predetermined value or greater, from among the hint items. Furthermore, if any item is selected by the user from among the displayed hint items, the hint display controller 149 displays on the output device one or more sub-items that are included in the hint item selected by the user, based on the second evaluation values. For example, the hint display controller 149 searches the database file DBFa for one or more sub-items included in a hint item that is selected by the user, and displays the sub-items in order from highest to lowest of the second evaluation value.

The estimation model learner 150 is an example of a learner that reflects, in the first estimation model 142, a result of the user's input operation for the displayed hint items. The estimation model learner 150 updates the first estimation model 142, based on the following (i) and (ii):
(i) the result of whether any of the hint items, in each of which the first evaluation value is the first predetermined value or greater, is selected by the user (i.e., the hint items displayed by the hint display controller 149), and
(ii) a log recorded in a predetermined period immediately before.

In other words, the estimation model learner 150 learns the result of input operation made by the user. In addition, the estimation model learner 150 may update the first estimation model 142, based on the following (i) and (ii):
(i) the result of whether one or more sub-items, which are included in a hint item that is selected by the user, was helpful, and
(ii) a log recorded in a predetermined period immediately before.

The server apparatus 200 shown in FIG. 4 has the same configuration as that shown in FIG. 1. The server apparatus 200 includes a processor 210, a memory 260, and a communication apparatus 270. However, the control program PR2a and the database file DBFa stored in the memory 260 differ from the control program PR2 and the database file DBF shown in FIG. 1.

The server apparatus 200 collects information on inquiries from users received at a call center, and thereby generates the first estimation model 142 and the second estimation model 144. The processor 210 acts as an estimation model generator 220a by reading a control program PR2a from the memory 260 and executing the program. The estimation model generator 220a generates the first estimation model 142 and the second estimation model 144, by use of machine learning. In the machine learning, the following inputs (i) and (ii) are made:

(i) logs of a plurality of the information processing apparatuses 100 (e.g., smartphones) carried by users who have made inquiries to the call center; and
(ii) logs of the call center.
The first estimation model 142 and the second estimation model 144 generated by the estimation model generator 220a is transferred to the information processing apparatus 100 in program form executable by the first estimation model 142 and the second estimation model 144.

The configuration of the information processing apparatus 100 and the server apparatus 200 is not limited to the example shown in FIG. 4. Some or all of the file acquirer 130, the estimation model acquirer 132 and the estimation model learner 150 may be omitted from the information processing apparatus 100. If the information processing apparatus 100 obtains the updated first estimation model 142 from the server apparatus 200, the information processing apparatus 100 may reflect in the updated first estimation model 142 the result of learning obtained from the estimation model learner 150 for the first estimation model 142 which is not yet updated. For example, since the hint items are learned by the estimation model learner 150, the information processing apparatus 100 may port the processing of the estimation related to the first evaluation values of the hint items, from the first estimation model 142 which is not yet updated, to the updated first estimation model 142. Alternatively, if hint items are added by the first estimation model 142 which is not yet updated, the information processing apparatus 100 may port the processing of the estimation related to the first evaluation values of the added hint items, from the first estimation model 142 which is not yet updated, to the updated first estimation model 142, thereby updating the first estimation model 142. The same is applied to the second estimation model 144, as well as the estimation model 142. If the information processing apparatus 100 obtains the updated second estimation model 144 from the server apparatus 200, the information processing apparatus 100 may reflect the learning result, which is obtained by the estimation model learner 150 for the second estimation model 144 which is not yet updated, in the updated second estimation model 144. The learning result obtained by the estimation model learner 150 is reflected in the updated first estimation model 142 and the updated second estimation model 144, and therefore, the learning result for each user can be used effectively.

FIG. 5 shows an example of the database file DBFa. The database file DBFa includes a plurality of links, in each of which the following (i) to (v) are linked with one another:
(i) a hint ID,
(ii) a hint item,
(iii) a sub-item, content of a hint,
(iv) a display event that causes a display of a hint, and
(v) a condition of displaying a hint.
The hint ID, for example, a hint TD denoted by "HINT1.1", identifies a sub-item. A portion of a hint ID is used as a hint item ID that identifies each hint item. In the example shown in FIG. 5, a numerical number between "HINT" and "." in the hint ID identifies each hint item. For example, a hint ID denoted by "HINT1.x" indicates that the hint item is an Email. Here, x is a natural number. A hint ID denoted by "HINT2.x" indicates that the hint item is a chat.
A hint ID denoted by "HINT3.x" indicates that the hint item is a telephone call. A hint ID denoted by "HINTm.x" indicates that the hint item is Wi-Fi. Here, m is an integer that is equal to or greater than 4.

In the example shown in FIG. 5, a hint ID denoted by "HINT0.0" is linked with a display event as an example of the predetermined event, which is used for estimating one or more hints sought by the user, based on the log. The result of the linking is stored in the database file DBFa. Furthermore, the hint ID denoted by "HINT0.0" is linked with a display condition, which is used for estimating the hints based on the log. The result of the linking is stored in the database file DBFa. An example of the predetermined event described the above is the launch of the assistance application, in which case, an example of the display condition described above is that the first evaluation value is 70(%) or greater.

The information stored in the database file DBFa is not limited to the example shown in FIG. 5. The predetermined event, and the display condition described the above, may be stored in a file separate from the database file DBFa used for the control program PR1a. For application of the database file DBFa shown in FIG. 5 to those in the fourth and subsequent embodiments shown in FIG. 12, the database file DBFa includes the display events of each sub-item and the display conditions. In use of the database file DBFa by the hint provider 120a shown in FIG. 4 and the hint provider 120b shown in FIG. 10, the database file DBFa is not required to include the display events of each sub-item and the display conditions.

Figure 6A:
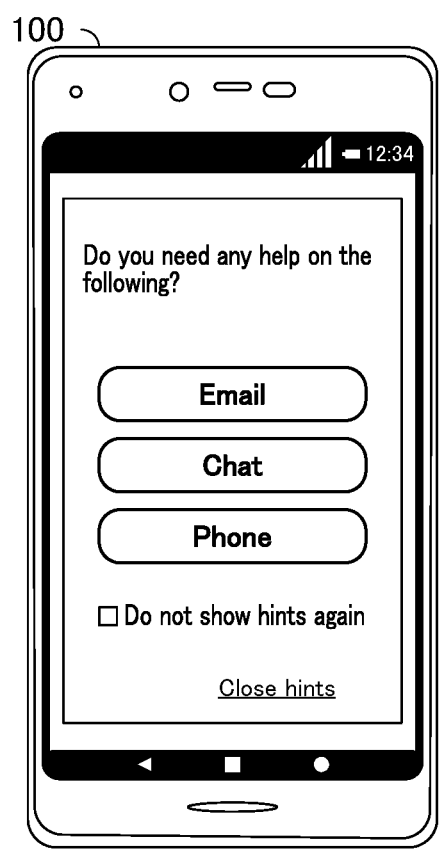
FIG. 6A is an explanatory diagram of an overview of the operation of the information processing apparatus shown in FIG. 4.
Figure 6B:
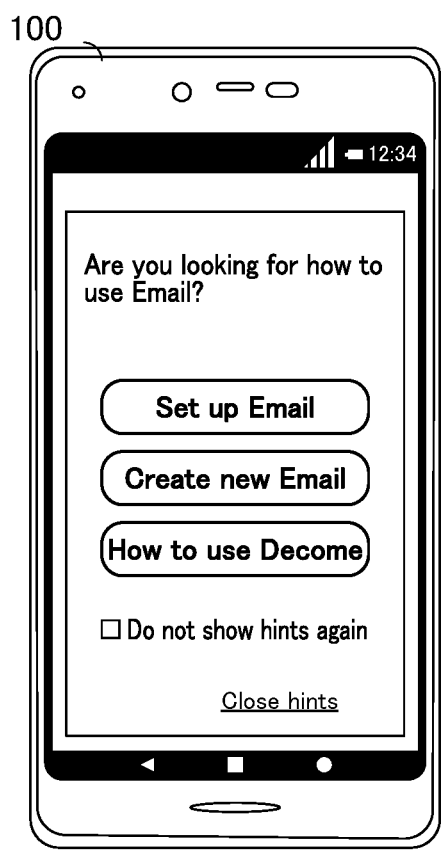
FIG. 6B is an explanatory diagram of an overview of the operation of the information processing apparatus shown in FIG. 4.
Figure 6C:
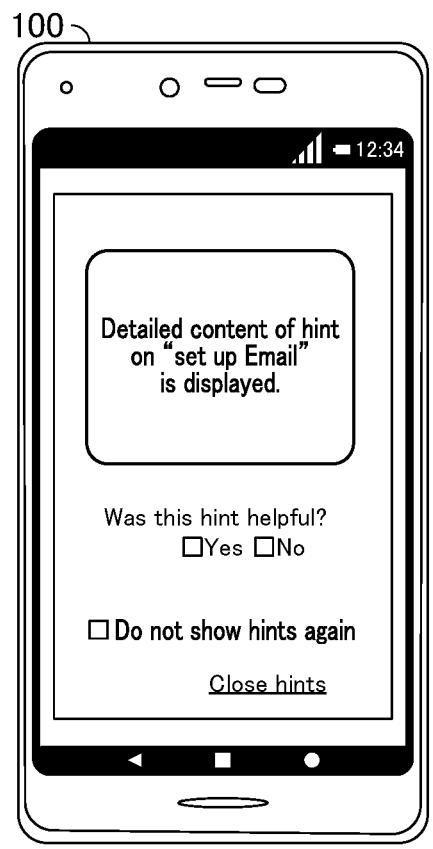
FIG. 6C is an explanatory diagram of an overview of the operation of the information processing apparatus shown in FIG. 4.

FIGS. 6A, 6B and 6C each are explanatory diagrams showing an overview of the operation of the information processing apparatus 100 shown in FIG. 4. In the operation of the information processing apparatus 100 shown in FIGS. 6A to 6C, an example is given in which the predetermined event is the launch of the assistance application, and the display condition is that the first evaluation value is 70(%) or greater.

First, upon execution of the user's input operation to launch the assistance application, the processor 110 launches the assistance application. The log acquirer 140 acquires a log at the occurrence of the event of the launch of the assistance application. Then, the first estimation model 142 calculates a first evaluation value for each of the hint items by use of the log. The hint display controller 149 displays on the output device one or more hint items, in each of which the first evaluation value is 70(%) or greater, and calculated by the first estimation model 142. Here, one example is given in which (i) a first evaluation value of a hint item denoted by "Email" is 80(%), (ii) a first evaluation value of a hint item denoted by "Chat" is 70(%), (iii) a first evaluated value of a hint item denoted by "Phone is 74(%), and (iv) first evaluation values of the other hint items are less than 70(%). In this case, the hint display controller 149 displays on the output device buttons representative of "Email," "Chat," and "Phone" (See display screen D1 shown in FIG. 6A).

Next, the hint display controller 149 displays on the output device sub-items included in a hint item selected by the user in order from highest to lowest of the second evaluation value. For example, if the user selects "Email", the hint display controller 149 displays on the output device buttons representative of "Set up Email", "Create new Email" and "How to use Decome (registered trademark)", which are sub-items one level down in "Email" in order from highest to lowest of the second evaluation value (see display screen D2 in FIG. 6B). In the example shown in FIG. 6B, the order from highest to lowest of the second evaluation value is "Set up Email," "Create new Email," and "How to use Deco-mail" in that order. "Decome" is an Email that is decorated with images, such as pictures.

Next, the hint display controller 149 displays on the output device a hint (content) of the sub-item selected by the user. For example, if "Set up Email" is selected by the user, the hint display controller 149 displays on the output device (i) detail of a hint indicative of the setup of an Email and (ii) a check box for the user feedback (see display screen D3 in FIG. 6C). The check box for the user's feedback refers to a feedback for returning information on whether the displayed hint was helpful for the user to the first estimation model 142 and the second estimation model 144.

As shown in FIGS. 6A to 6C, since the hint provider 120a estimates hints sought by the user to display it, the usability of the information processing apparatus 100 is improved.

If hints sought by the user are not estimated, for example, if there are hint items, in each of which the first evaluation value is 70(%) or greater, the hint provider 120a may display the button for the phone number of the call center, the button for the call center, the button for the link screen to the customer support page, or the like.

Figure 7:
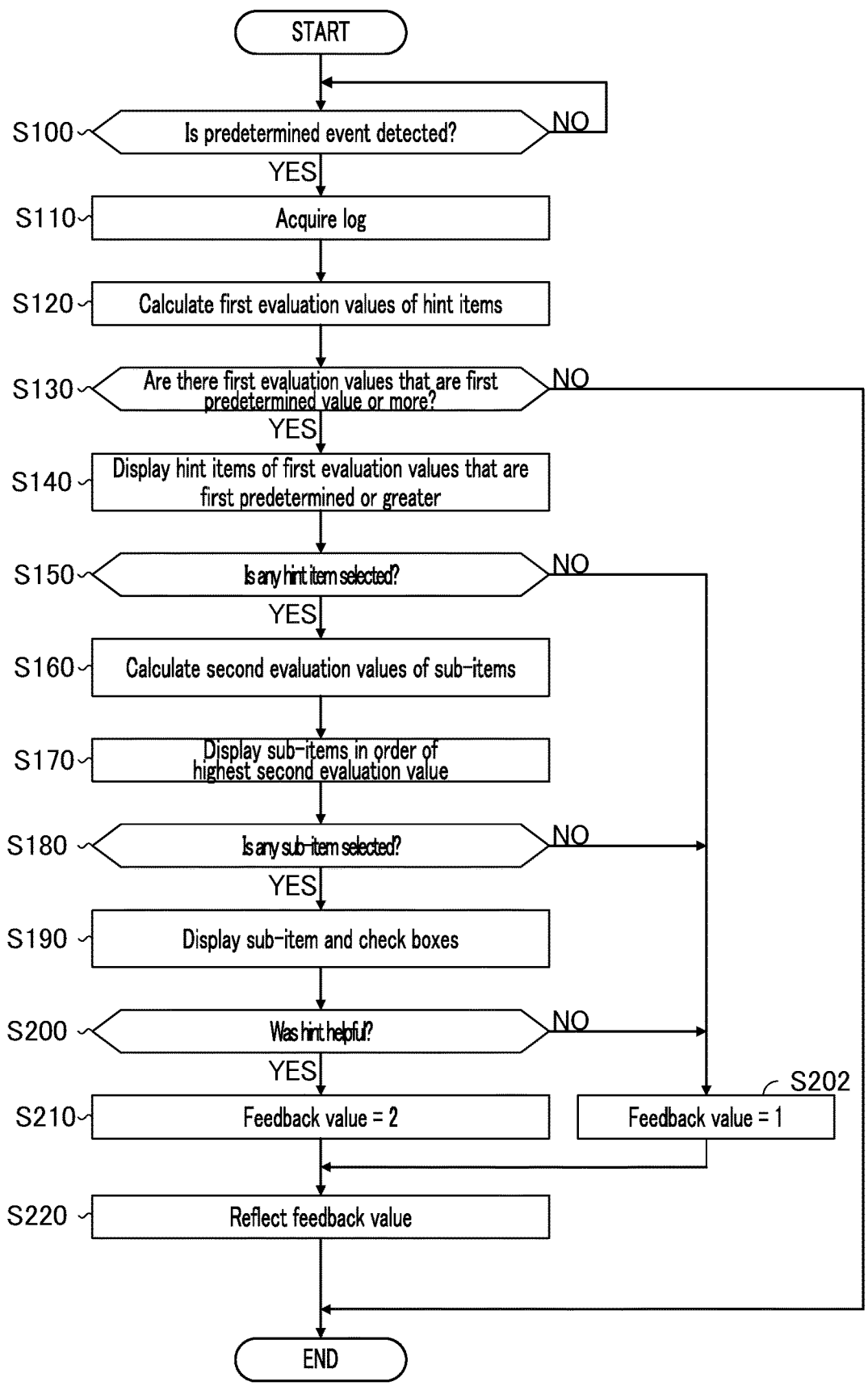
FIG. 7 is a flowchart showing an example of operation of the information processing apparatus shown in FIG. 4.

FIG. 7 is a flowchart showing an example of operation of the information processing apparatus 100 shown in FIG. 4. The operation shown in FIG. 7 is an example of a hint provision method. The operation shown in FIG. 7 is an example of the operation of the information processing apparatus 100 carried out after the database file DBFa is acquired from the server apparatus 200. The steps S100, S110, S120, S130, and S140 are the same as, or similar to, the operation described in FIG. 3, so detailed description thereof is omitted.

In step S100, the processor 110 determines whether the predetermined event is detected. The processor 110 repeats step S100 until the predetermined event is detected. If the predetermined event is detected, the processor 110 acts as the log acquirer 140 in step S110 to acquire the log, and thereafter moves the operation to step S120. In step S120, the processor 110 acts as the first estimation model 142, and calculates a first evaluation value of each of the hint items, by use of the log acquired in step S110.

Next, in step S130, the processor 110 acts as the finder 146, and determines whether one or more first evaluation values, each of which is the first predetermined value or greater, is among the first evaluation values calculated in step S120. If one or more first evaluation values, each of which is the first predetermined value or greater, are not found, the process of providing hints in response to the predetermined event is ended. In contrast, if the first evaluation values are found, the processor 110 acts as the hint display controller 149 in step S140. Then, the processor 110 finds one or more hint items, in each of which the first evaluation values is the first predetermined value or greater, and displays the hint items. Accordingly, as shown in the example of the display screen D1 of FIG. 6, hint items, in each of which the first evaluation value is the first predetermined value or greater, are displayed. After step S140 is executed, the operation of the information processing apparatus 100 is moved to step S150.

In step S150, the processor 110 determines whether one or more hint items are selected from among the hint items displayed in step S140. For example, if the user moves the current display screen to another screen without selecting any of the hint items displayed in step S140, the processor 110 determines that none of the hint items is selected. For example, if "Close Hints" is selected in the display screen D1 shown in FIG. 6, the display screen D1 transitions to another screen without any of the hint items being selected. If no hint items are selected, the operation of the information processing apparatus 100 is moved to step S202. In contrast, if a hint item is selected, the operation of the information processing apparatus 100 is moved to step S160.

In step S160, the processor 110 acts as the second estimation model 144, and calculates the second evaluation values of the sub-items included in a hint item selected by the user, by use of the log acquired in step S110. For example, the second estimation model 144 calculates a second evaluation value for each of the sub-items registered in the database file DBFa, by use of the log acquired in S110. Thereafter, the second estimation model 144 links with the corresponding hint ID each of the second evaluation values of the sub-items included in a hint item that is selected by the user. The second estimation model 144 then stores the result of the linking in the memory 160 or the storage 162. Alternatively, the second estimation model 144 may link with the hint ID each of the second evaluation values of the sub-items, and may notify the hint display controller 149 of the result of the linking.

Next, in step S170, the processor 110 acts as the hint display controller 149, and displays on the output device the sub-items included in the hint item selected by the user in order from highest to lowest of the second evaluation value calculated in step S160. Accordingly, for example, as shown in the display screen D2 of FIG. 6, the sub-items included in the hint item selected by the user are displayed in the order from highest to lowest of the second evaluation value.

Next, in step S180, the processor 110 determines whether one or more sub-items from among the sub-items displayed in step S170 are selected. For example, if the user moves the current display screen to another screen without selecting any of the sub-hint items displayed in step S170, the processor 110 determines that none of the sub-hint items is selected. For example, if "Close Hints" is selected on the display screen D2 shown in FIG. 6, the display screen D2 transitions to another screen without any of the sub-items being selected. If no sub-items are selected, the operation of the information processing apparatus 100 is moved to step S202. In contrast, if a sub-item is selected, the operation of the information processing apparatus 100 is moved to step S190.

In step S190, the processor 110 acts as the hint display controller 149, and displays on the output device (i) details of the sub-item selected by the user and (ii) the check box for the user's feedback. Accordingly, for example, as shown in the display screen D3 of FIG. 6, the details of the sub-item selected by the user and the check box for the user's feedback are displayed. In the example shown in FIG. 6, the question "Was this hint helpful?", and the check boxes "Yes" and "No" are displayed.

Next, in step S200, the processor 110 determines whether the hint (content of the sub-item) displayed in step S170 was helpful. For example, the processor 110 determines that the hint was helpful if a check is filled in the check box "Yes" as an answer to the question "Was this hint helpful?". In contrast, the processor 110 determines that the hint was not helpful, if a check is filled in the check box "No" as an answer to the question.

If the user moves the current display screen to another screen without filling a check in any of the check boxes, the determination of whether the hint was helpful is defined in advance. If the hint was helpful, the operation of the information processing apparatus 100 is moved to step S210. In contrast, if the hint was not helpful, the operation of the information processing apparatus 100 is moved to step S202.

In step S202, the processor 110 sets a feedback value to "1", and thereafter the operation is moved to step S220.

In step S210, the processor 110 sets the feedback value to "2", and thereafter the operation is moved to step S220. As the feedback value is higher, a hint closer to the hint sought by the user is estimated.

In step S220, the processor 110 acts as the estimation model learner 150 and reflects the user's reaction to the displayed hints in the first estimation model 142 and the second estimation model 144. Specifically, the estimation model learner 150 reflects the feedback value set in step S202 or step S210 in the first estimation model 142 and the second estimation model 144, to cause the first estimation model 142 and the second estimation model 144 to be learned. The learning improves the accuracy of the estimation of the first estimation values calculated by the first estimation model 142 and the accuracy of the second estimation values calculated by the second estimation model 144. Accordingly, the usability of the information processing apparatus 100 is improved.

Figure 8:
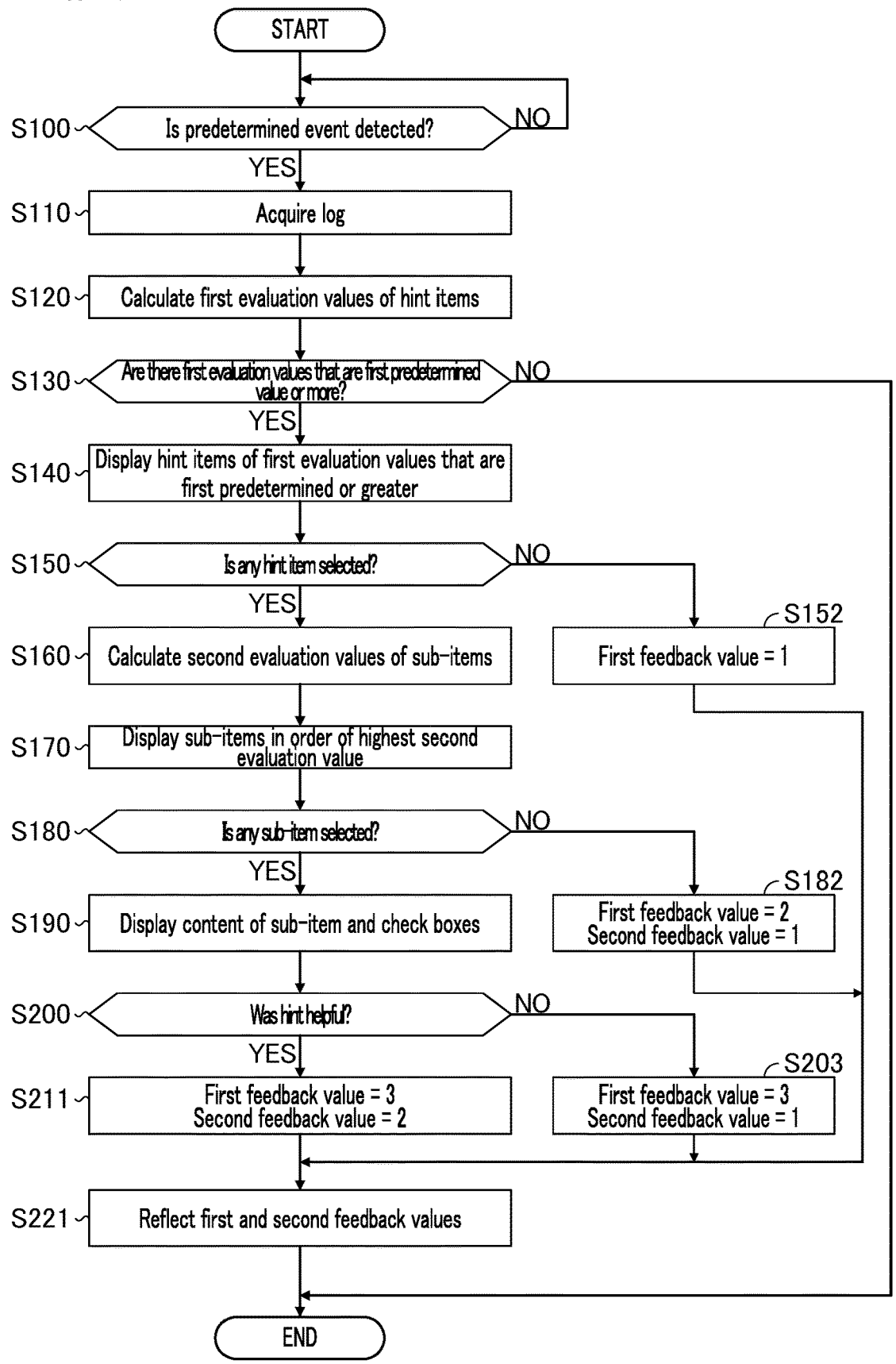
FIG. 8 is a flowchart showing another example of operation of the information processing apparatus shown in FIG. 4.

The operation of the information processing apparatus 100 is not limited to the operation shown in FIG. 7. For example, as shown in FIG. 8, different feedback values may be reflected in the first estimation model 142 and the second estimation model 144. Furthermore, if the user moves the current display screen to another screen without filling a check in any of the check boxes in step S190, the information processing apparatus 100 may set a feedback value to an intermediate value (e.g., 1.5) between a case in which the hint was not helpful and a case in which the hint was helpful.

FIG. 8 is a flowchart showing another example of the operation of the information processing apparatus 100 shown in FIG. 4. The operation shown in FIG. 8 is an example of a hint provision method. In the operation shown in FIG. 8, steps S152, S182 and S203 are executed instead of step S202 shown in FIG. 7. Step S211 is executed instead of step S210 shown in FIG. 7. Furthermore, step S221 is executed instead of step S220 shown in FIG. 7. The other operation shown in FIG. 8 is the same as that shown in FIG. 7. Accordingly, in FIG. 8, description of the operation of the information processing apparatus 100 will be given with a focus on steps S152, S182, S203, S211 and S221.

Step S152 is executed if it is determined in step S150 that the hint item was not selected. Step S182 is executed if it is determined in step S180 that the sub-item was not selected. Step S203 is executed if it is determined in step S200 that the hint was not helpful. Then step S211 is executed if it is determined in step S200 that the hint was helpful.

In step S152, the processor 110 sets the first feedback value to "1" and, thereafter, moves the operation to step S221. The first feedback value is reflected in the first estimation model 142. As the first feedback value is greater, a hint item that includes a hint closer to the hint sought by the user is estimated.

In step S182, the processor 110 sets the first feedback value to "2", sets the second feedback value to "1", and thereafter, moves the operation to step S221. The second feedback value is reflected in the second estimation model 144. As the second feedback value is greater, a sub-item that includes a hint closer to the hint sought by the user is estimated.

In step S203, the processor 110 sets the first feedback value to "3", the second feedback value to "1", and thereafter, moves the operation to step S221.

In step S211, the processor 110 sets the first feedback value to "3", the second feedback value to "2", and thereafter, moves the operation to step S221.

In step S221, the processor 110 acts as the estimation model learner 150, and reflects the user's reaction to the displayed content in the first estimation model 142 and the second estimation model 144. For example, the estimation model learner 150 updates the first estimation model 142, based on the following:
(i) the first feedback value set in steps S152, S182, S203 or step S211, and
(ii) the log acquired in step S110.
Furthermore, the estimation model learner 150 updates the second estimation model 144, based on the following:
(i) the second feedback value set in steps S182, S203 or S211, and
(ii) the log acquired in step S110.
In the operation shown in FIG. 8, the detailed feedback values to be reflected in the first estimation model 142 and the second estimation model 144 can be set as compared with the operation shown in FIG. 7. Accordingly, the learning can be executed efficiently.

In the operation shown in FIG. 8, if the user moves the current display screen to another screen without filling a check in any of the check boxes in step S190, the information processing apparatus 100 may set both the first and the second feedback values to an intermediate value between a case in which the hint was not helpful and a case in which the hint was helpful.

Figure 9:
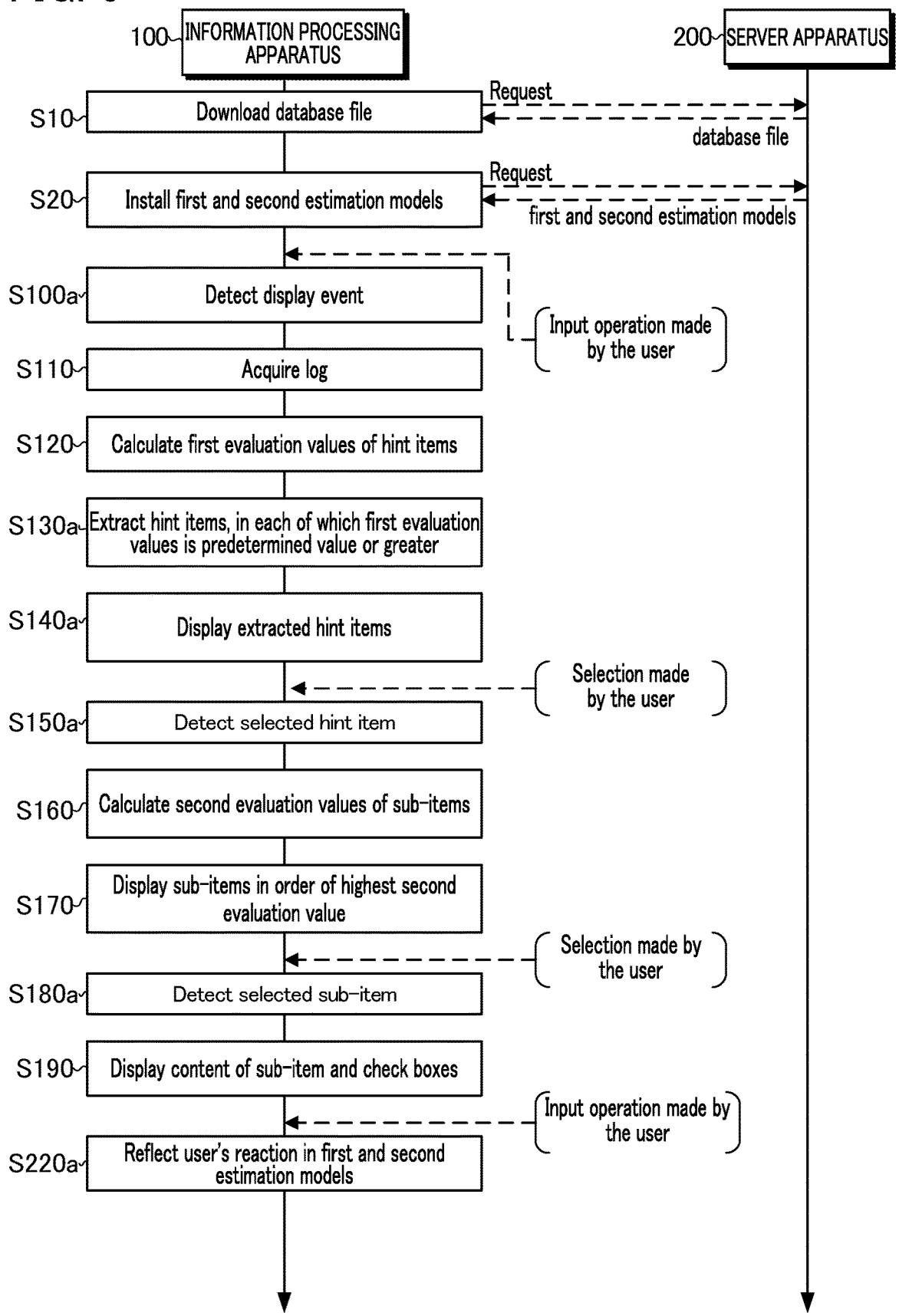
FIG. 9 is a sequence chart showing an example of the operation of the system shown in FIG. 4.

FIG. 9 is a sequence chart showing an example of the operation of the system 10 shown in FIG. 4. The same or similar operation described in FIG. 7 will be denoted by the same reference signs, and detailed description will be omitted. For example, steps S100a, S130a, S140a, S150a, S180a and S220a correspond to steps S100, S130, S140, S150, S180 and S220 described in FIG. 7, respectively. Steps S110, S120, S160, S170 and S190 are the same as steps S110, S120, S160, S170 and S190 described in FIG. 7, respectively In the operation shown in FIG. 9, the display event (the predetermined event) is set to the launch of the assistance application.

In step S10, the information processing apparatus 100 downloads the database file DBFa. Specifically, the information processing apparatus 100 transmits, to the server apparatus 200, a database file request for a download of the database file DBFa. Upon receiving the database file request, the server apparatus 200 transfers the database file DBFa to the information processing apparatus 100. The information processing apparatus 100 stores the database file DBF transferred from the server apparatus 200 in the memory 160 or storage 162.

Next, in step S20, the information processing apparatus 100 installs therein the first estimation model 142 and the second estimation model 144. Specifically, the information processing apparatus 100 transmits an estimation model request to the server apparatus 200, the estimation model request being representative of a request of download of the first estimation model 142 and the second estimation model 144. Upon receiving the estimation model request, the server apparatus 200 transfers the first estimation model 142 and the second estimation model 144 to the information processing apparatus 100. Then the server apparatus 200 transfers the programs for the first estimation model 142 and the second estimation model 144 to the information processing apparatus 100. The information processing apparatus 100 installs therein the first estimation model 142 and the second estimation model 144 by executing the programs transferred from the server apparatus 200 (the programs for the first estimation model 142 and the second estimation model 144).

Next, in step S100a, when the user carries out operation of launching the assistance application, the information processing apparatus 100 detects the launch of the assistance application, as a display event. Thereafter, upon the detection of the launch of the assistance application, the information processing apparatus 100 launches the assistance application.

Next, in step S110, upon detecting the display event (launch of the assistance application) in step S100a, the information processing apparatus 100 obtains the log from the memory 160 or the storage 162. Next, in step S120, the information processing apparatus 100 inputs the log acquired in step S110 into the first estimation model 142, and calculates a first evaluation value of each of the hint items. The information processing apparatus 100 then links each of the first evaluation values of the hint items with the corresponding hint item ID, and stores the result of the linking in the memory 160 or the storage 162.

Next, in step S130a, the information processing apparatus 100 extracts one or more hint item IDs (hint items), each of which is calculated in step S120 and has a first evaluation that is the first predetermined value or greater. Next, in step S140a, the information processing apparatus 100 searches the database file DBFa for the hint items that are linked with the respective hint item IDs extracted in step S130a, and displays the hint items. Accordingly, as shown in the display screen D1 of FIG. 6, the hint items, in each of which the first evaluation value is the first predetermined value or greater, are displayed.

Next, in step S150a, when a hint item is selected by the user, the information processing apparatus 100 detects the selection of the hint item. Upon detection of the selection of the hint item, the information processing apparatus 100 identifies the hint item selected by the user from the hint items displayed in step S140a. Thereafter, a hint item is selected.

Next, in step S160, the information processing apparatus 100 inputs the log acquired in step S110 into the second estimation model 144, and calculates a second evaluation value of each of the sub-items included in the hint item selected in step 150a.

Then, the information processing apparatus 100 links each of the calculated second evaluation values of the sub-items with the corresponding hint ID, and stores the result of the linking in the memory 160 or the storage 162.

Next, in step S170, the information processing apparatus 100 displays the sub-items included in the hint item selected in step 150a in order from highest to lowest of the second evaluation value calculated in step S160. Specifically, the information processing apparatus 100 searches the database file DBFa for one or more sub-items, each of which is linked with the hint ID of the second evaluation value (a second evaluation value representative of a sub-item included in the hint item selected in step s150a) calculated in step S160. The information processing apparatus 100 displays the sub-items in order from highest to lowest of the second evaluation value. Accordingly, as shown in the display screen D2 of FIG. 6, the sub-items included in the hint item selected by the user are displayed in order from highest to lowest of the second evaluation value.

Next, in step S180a, when a sub-item is selected by the user, the information processing apparatus 100 detects the selection of the sub-item. The information processing apparatus 100 identifies the sub-item selected by the user from the sub-items displayed in step S170 in response to the detection of the selection of the sub-item. Thereafter, a sub-item is selected.

Next, in step S190, the information processing apparatus 100 displays the descriptions of the sub-items selected in step S180a and the check box for the user's feedback.

Accordingly, as shown in the display screen D3 of FIG. 6, the detailed hint contents of the sub-item selected by the user and the check box for the user's feedback are displayed.

Next, in step S220a, upon receiving the user's input operation of filling a check in a check box, the information processing apparatus 100 reflects the user's reaction to the displayed content in the first estimation model 142 and the second estimation model 144.

If the user filled a check in the check box "Yes" as an answer to the question "Was this hint helpful?", the information processing apparatus 100 reflects, in the first estimation model 142 and the second estimation model 144, the result indicating that the hint displayed in step S190 was helpful. Specifically, the estimation model learner 150 updates the first estimation model 142 and the second estimation model 144, based on the following:
(i) the user's reaction indicating that the hint was helpful and
(ii) the log recorded in the predetermined period immediately before the user's reaction.

In contrast, if the user filled a check in the check box "No" as an answer to the question, the information processing apparatus 100 reflects, in the first estimation model 142 and the second estimation model 144, the result indicating that the hint displayed in step S190 was not helpful. Specifically, the estimation model learner 150 updates the first estimation model 142 and the second estimation model 144, based on the following:
(i) the user's reaction indicating that the hint was not helpful and
(ii) the log recorded in the predetermined period immediately before the user's reaction.

The server apparatus 200 (the estimation model generator 220a) may carry out the process of the estimation model learner 150.

The learning described above improves the accuracy of the estimation of the first evaluation value calculated by the first estimation model 142 and the accuracy of the second evaluation value calculated by the second estimation model 144. Accordingly, the usability of the information processing apparatus 100 is improved.

In the second embodiment, the same effect is provided similarly to the first embodiment. In the second embodiment, the information processing apparatus 100 includes the second estimation model 144. The second estimation model 144 calculates, based on at least the input log, a second evaluation value for each of the sub-items that are obtained by further separating each of the hint items into categories. Here, the second evaluation value represents the likelihood of whether each of the sub-items is a sub-item that includes a hint sought by the user. Furthermore, the hint display controller 149 displays, on the output device, one or more hint items, in each of which the first evaluation value is the first predetermined value or greater. If at least one hint item is selected by the user from among the displayed hint items, the hint display controller 149 displays on the output device one or more sub-items included in the hint item selected by the user from among the sub-items, based on the second evaluation values. In the second embodiment, the sub-items included in the hint item selected by the user are displayed. Accordingly, the user is able to find with ease the hint the user would like to know, as compared with a case in which the detailed contents of a plurality of hints that are included in a hint item selected by the user, are displayed.

Furthermore, if the sub-items of the hint item selected by the user are displayed in order from the highest second evaluation value, the user is able to find a hint the user would like to know, as compared with a case in which the sub-items are displayed unordered.

The information processing apparatus 100 further includes the estimation model learner 150. The estimation model learner 150 reflects, in the first estimation model 142 and the second estimation model 144, the result of the user's input operation regarding the displayed hint items. The update of the first estimation model 142 and the second estimation model 144 by the estimation model learner 150 improves the accuracy of the estimations of the first estimation values and the second estimation values.

Furthermore, the information processing apparatus 100 includes the estimation model acquirer 132. The estimation model acquirer 132 acquires the first estimation model 142 and the second estimation model 144 from the server apparatus 200. Since the estimation model acquirer 132 acquires the first estimation model 142 and the second estimation model 144 from the server apparatus 200, the information processing apparatus 100 can calculate the first and the second evaluation values by use of the latest first and the second estimation models 142 and 144.

3. Third Embodiment

The main point of difference between the third embodiment and the foregoing second embodiment is as follows. If there is a hint item in which the first evaluation value is a second predetermined value or greater, the display of the hint item is skipped. Here, the second predetermined value is greater than the first predetermined value. Thereafter, one or more sub-items included in the hint items are displayed in order from highest to lowest of the second evaluation value.

Figure 10:
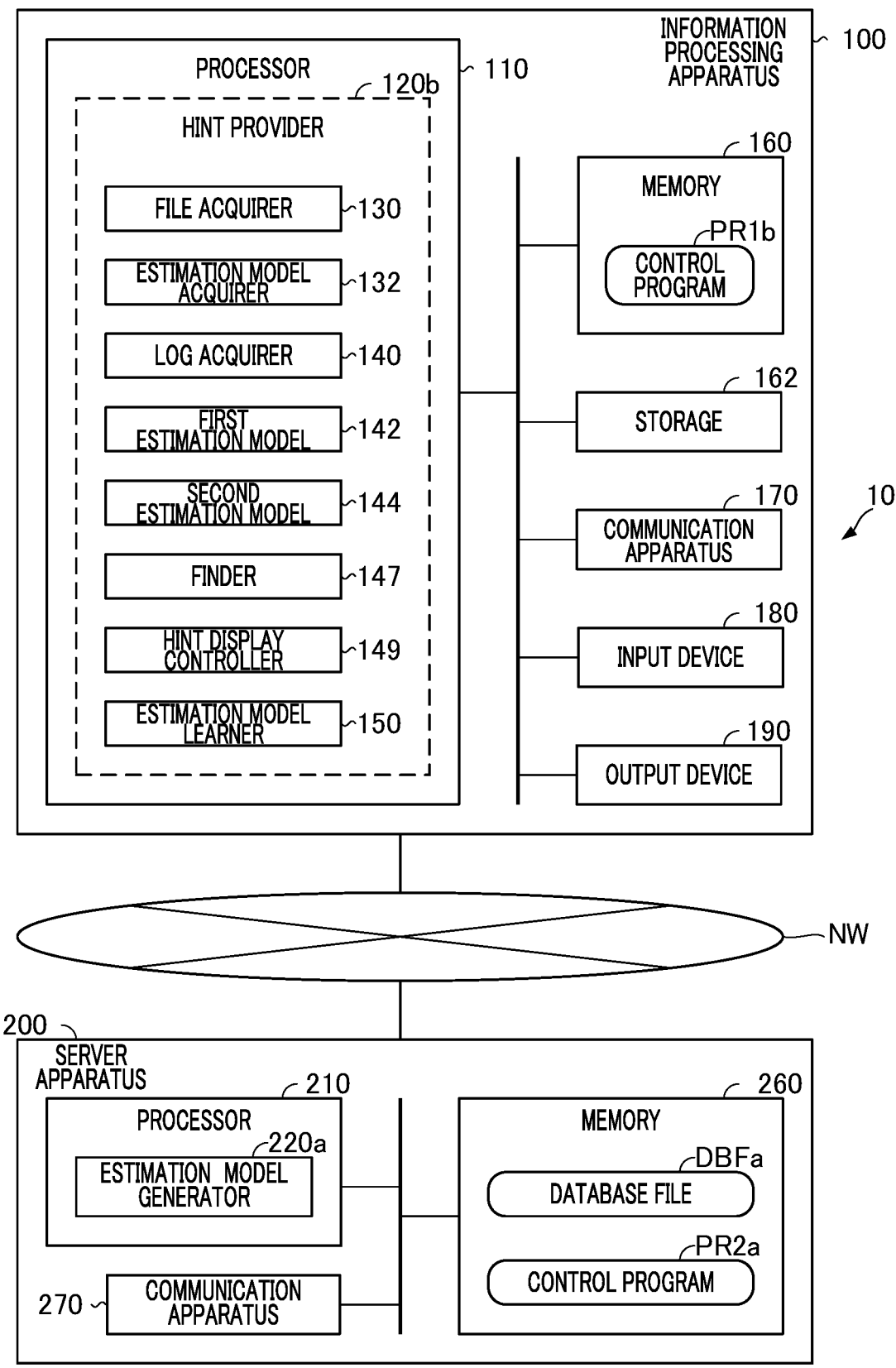
FIG. 10 is a block diagram showing the overall configuration of the system according to a third embodiment of the present invention.

FIG. 10 is a block diagram showing the overall of configuration of the system 10 according to the third embodiment of the present invention. The same or similar components described in FIGS. 1 to 9 will be denoted by the same reference signs, and detailed description will be omitted. The system 10 shown in FIG. 10 has the same configuration as that shown in FIG. 4. The system 10 includes the information processing apparatus 100, the network NW and the server apparatus 200.

The information processing apparatus 100 shown in FIG. 10 has the same configuration as that shown in FIG. 4. The information processing apparatus 100 is realized by a computer system that includes the processor 110, the memory 160, the storage 162, the communication apparatus 170, the input device 180 and the output device 190. However, the control program PR1b stored in the memory 160 differs from the control program PR1a shown in FIG. 4. Each element of the information processing apparatus 100 is interconnected by a single or multiple buses. Each component of the information processing apparatus 100 may be composed of a single or plurality of apparatuses. Some components of the information processing apparatus 100 may be omitted.

The processor 110 shown in FIG. 10 is the same as or similar to that shown in FIG. 4, except that the control program PR1b is executed instead of the control program PR1a shown in FIG. 4. The processor 110 acts as a hint provider 120b by reading the control program PR1b from the memory 160 and executing the program.

The hint provider 120b provides usage hints of the information processing apparatus 100 to the user, as well as the hint provider 120a shown in FIG. 4. Specifically, the hint provider 120b estimates, based on the log, one or more hint items including hints sought by the user, and displays the hint items with high likelihood of the estimation result.

Examples of functional blocks of the hint provider 120*b* shown in FIG. 10 include the file acquirer 130, the estimation model acquirer 132, the log acquirer 140, the first estimation model 142, the second estimation model 144, the finder 147, the hint display controller 149 and the estimation model learner 150. That is, the information processing apparatus 100 includes the file acquirer 130, the estimation model acquirer 132, the log acquirer 140, the first estimation model 142, the second estimation model 144, the finder 147, the hint display controller 149 and the estimation model learner 150.

The file acquirer 130, the estimation model acquirer 132, the log acquirer 140, the first estimation model 142 and the estimation model learner 150 shown in FIG. 10 are the same as those shown in FIG. 4. Furthermore, the second estimation model 144 and the hint display controller 149 shown in FIG. 10 are the same as those shown in FIG. 4. However, the operation carried out by the second estimation model 144 and the hint display controller 149 is excluded in which there are one or more hint items, in each of which the first evaluation value is the second predetermined value or greater, the second predetermined value being greater than the first predetermined value. In FIG. 10, description of the finder 147 will be given with a focus on the difference between the hint provider 120*b* and the hint provider 120*a* shown in FIG. 4.

Similar to the finder 146 shown in FIG. 4, the finder 147 finds one or more hint items, in each of which the first evaluation value is the first predetermined value or greater, from among a plurality of hint items. In addition, the finder 147 finds, from among the hint items, one or more hint items, in each of which the first evaluation value is the second predetermined value or greater. Here, the second predetermined value is greater than the first predetermined value. Specifically, the finder 147 finds, from among the first evaluation values calculated by the first estimation model 142, one or more first evaluation values, each of which is the second predetermined value or greater. Then, the finder 147 stores the hint item IDs linked with the respective first evaluation values, each of which is the second predetermined value or greater, in the memory 160 or the storage 162. Alternatively, the finder 147 may notify the second estimation model 144 of the hint item IDs linked with the respective first evaluation values.

The second estimation model 144 calculates a second evaluation value of each of the sub-items included in a hint item in which the first evaluation value is the second predetermined value or greater. Specifically, the second estimation model 144 calculates a second evaluation value of each of the sub-items registered in the database file DBFa, by use of the log acquired by the log acquirer 140. Then, the second estimation model 144 links with the corresponding hint ID each of the second evaluation values of the sub-items included in the hint item in which the first evaluation value is the second predetermined value or greater. The second estimation model 144 stores the result of the linking in the memory 160 or the storage 162. Alternatively, the second estimation model 144 may link with the corresponding hint ID each of the second evaluation values of the sub-items included in the hint item in which the first evaluation value is the second predetermined value or greater, and may notify the hint display controller 149 of the result of the linking.

Similar to the hint display controller 148 shown in FIG. 4, the hint display controller 149 displays on the output device one or more hint items, in each of which the first evaluation value is the first predetermined value or greater, from among the hint items. If at least one hint item is selected by the user from among the displayed hint items, the hint display controller 149 displays on the output device one or more sub-items included in the hint item selected by the user from among the sub-items, based on the second evaluation values. Furthermore, if there are one or more hint items, in each of which the first evaluation value is the second predetermined value or greater, the hint display controller 149 displays on the output device the sub-items included in that hint item in order from highest to lowest of the second evaluation value without displaying hint items, in each of which the first evaluation value is the first predetermined value or greater.

The server apparatus 200 shown in FIG. 10 has the same configuration as that shown in FIG. 4. The server apparatus 200 includes the processor 210, the memory 260, and the communication apparatus 270. The processor 210 acts as the estimation model generator 220*a* by reading a control program PR2*a* from the memory 260 and executing the program.

The configuration of the information processing apparatus 100 and the server apparatus 200 is not limited to the example shown in FIG. 10. One or some of the file acquirer 130, the estimation model acquirer 132 and the estimation model learner 150 may be omitted from the information processing apparatus 100.

Figure 11:
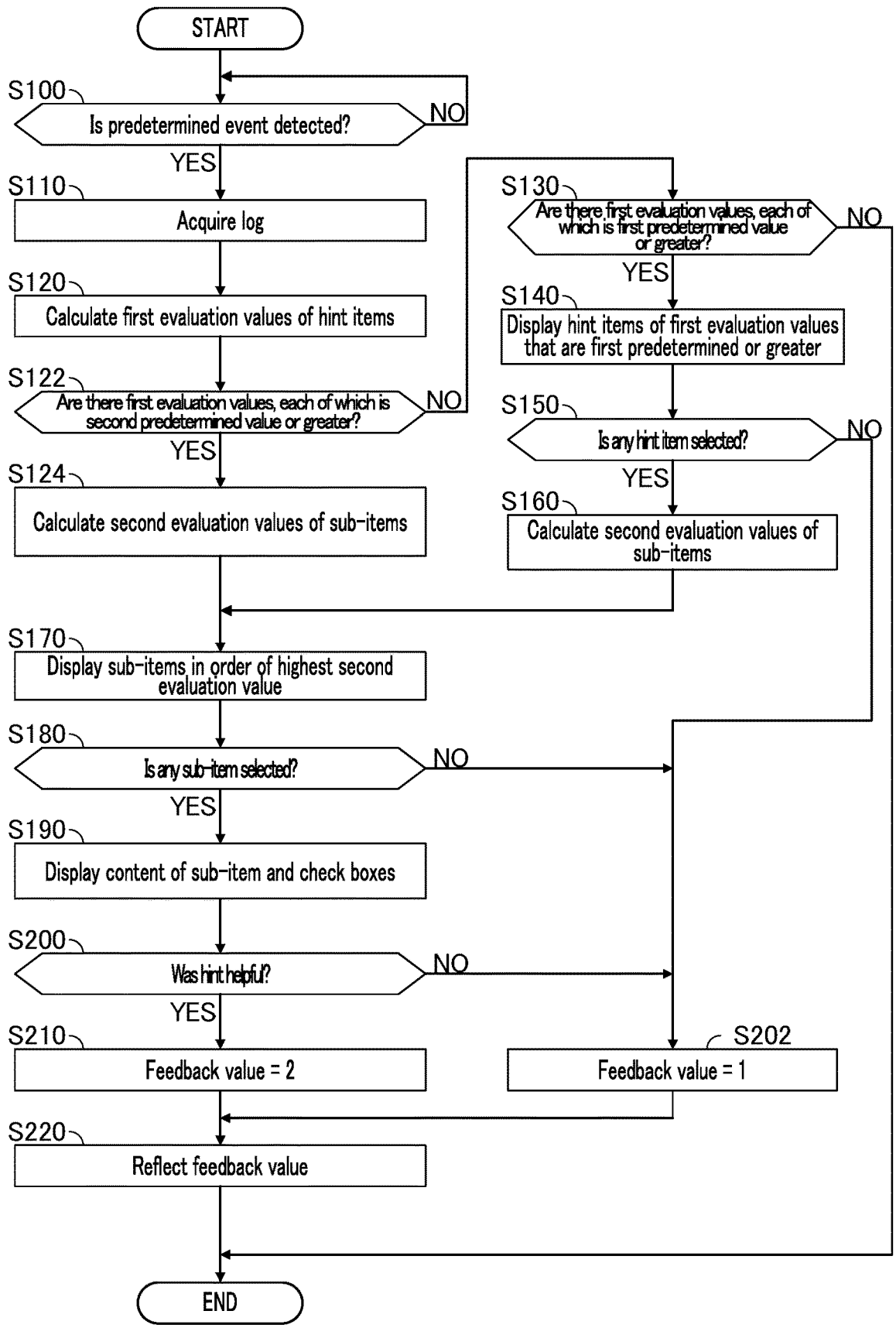
FIG. 11 is a flowchart showing an example of operation of the information processing apparatus shown in FIG. 10.

FIG. 11 is a flowchart showing an example of operation of the information processing apparatus 100 shown in FIG. 10. The operation shown in FIG. 11 is an example of a hint provision method. The operation shown in FIG. 11 is the same as that shown in FIG. 7, except that steps S122 and S124 are added to the operation shown in FIG. 7. Accordingly, in FIG. 11, description of the operation of the information processing apparatus 100 will be given with a focus on steps S122 and S124. Step S122 is executed after step S120.

In step S122, the processor 110 acts as the finder 147, and determines whether there are one or more first evaluation values, each of which is the second predetermined value or greater, among the first evaluation values calculated in step S120. If there are no the first evaluation values, each of which is the second predetermined value or greater, the operation of the information processing apparatus 100 is moved to step S130. In contrast, if the first evaluation values are found, the operation of the information processing apparatus 100 is moved to step S124.

In step S124, the processor 110 acts as the second estimation model 144, and calculates a second evaluation value of each of the sub-items included in a hint item, which has a first evaluation value that is the second predetermined value or greater, by use of the log acquired in step S110. For example, the second estimation model 144 calculates a second evaluation value for each of the sub-items registered in the database file DBFa, by use of the log acquired in step S110. Thereafter, the second estimation model 144 links with the corresponding hint ID each of the second evaluation values of the sub-items included in the hint item, which has a first evaluation value that is the second predetermined value or greater. The second estimation model 144 then stores the result of the linking in the memory 160 or the storage 162. Alternatively, the second estimation model 144 may link with the corresponding hint ID each of the second evaluation values, and may notify the hint display controller 149 of the result of the linking. After step S124, the operation of the information processing apparatus 100 is moved to step S170.

In step S170, the processor 110 acts as the hint display controller 149, and displays on the output device (a) one or more sub-items included in the hint item selected by the user or (b) one or more sub-items included in the hint item, which has a first evaluation value that is the second predetermined value or greater, in order from highest to lowest of the second evaluated value. If one or more first evaluation values, each of which is the second evaluation value or greater, are found, the hint display controller 149 displays on the output device the sub-items included in the hint item labeled (a) or (b) in order from highest to lowest of the second evaluation value calculated in step S124. In this case, the process of displaying the hint items, in each of which the first evaluation value is the first predetermined value or greater, is skipped. If there is no second evaluation value that is the second predetermined value or greater, the hint display controller 149 displays on the output device the sub-items included in the hint item selected by the user in order from highest to lowest of the second evaluation value calculated in step S160, as described in FIG. 7.

The operation of the information processing apparatus 100 is not limited to the example shown in FIG. 11. For example, the series of steps S122 and S124 may be added to the operation shown in FIG. 8. Alternatively, in step S124, the second estimation model 144 may calculate a second evaluation value of each of the sub-items included in the hint item that has the highest first evaluation value, by use of the log acquired in step S110. In this case, the hint display controller 149 displays the sub-items in order from highest to lowest of the second evaluation value in step S170. If there are a plurality of hint items, in each of which the first evaluation value is the second predetermined value or greater, the information processing apparatus 100 displays the sub-items included in the hint item that has the highest first evaluation value in order from highest to lowest of the second evaluation value. Accordingly, increase in the number of sub-items to be displayed is reduced.

In the third embodiment, the same effect is provided similarly to the second embodiment. In the third embodiment, the finder 147 finds, from among the hint items, one or more hint items, in each of which the first evaluation value is the second predetermined value or greater. Here, the second predetermined value is greater than the first predetermined value. Then, if there are one or more hint items, in each of which the first evaluation value is the second predetermined value or greater, the hint display controller 149 displays on the output device the sub-items included in that hint item in order from highest to lowest of the second evaluation value without displaying these hint items. Therefore, if there are hint items, in each of which the first evaluation value is the second predetermined value or greater, the user can save time and effort in selecting the hint items. The usability of the information processing apparatus 100 is improved.

4. Fourth Embodiment

The main point of difference between the fourth embodiment and the foregoing second embodiment is as follows. For each of the hints, a first display condition is defined in advance, and a hint which satisfies the corresponding first display condition is displayed, independent from a condition in which a hint item, in which the first evaluation value is the first predetermined value or greater, is displayed.

Figure 12:
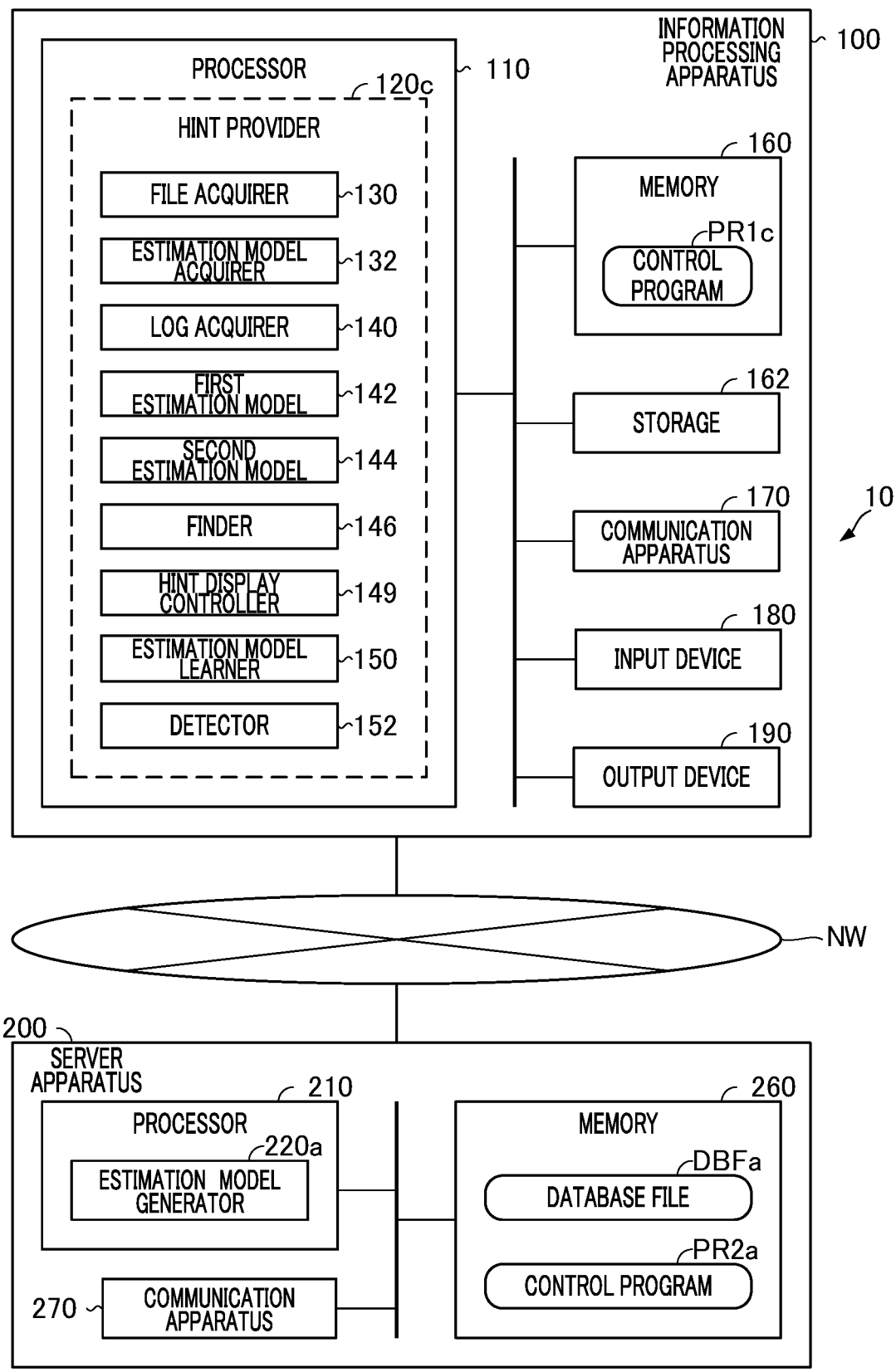
FIG. 12 is a block diagram showing the overall configuration of the system according to a fourth embodiment of the present invention.

FIG. 12 is a block diagram showing the entire configuration of the information processing apparatus 100 according to the fourth embodiment of the present invention. The same or similar components described in FIGS. 1 to 11 will be denoted by the same reference signs, and detailed description will be omitted. The system 10 shown in FIG. 12 has the same configuration as that shown in FIG. 4. The system 10 includes the information processing apparatus 100, the network NW and the server apparatus 200.

The information processing apparatus 100 shown in FIG. 12 has the same configuration as that shown in FIG. 4. The information processing apparatus 100 is realized by a computer system that includes the processor 110, the memory 160, the storage 162, the communication apparatus 170, the input device 180 and the output device 190. However, the control program PR1c stored in the memory 160 differs from the control program PR1a shown in FIG. 4. Each element of the information processing apparatus 100 is interconnected by a single bus or multiple buses. Each component of the information processing apparatus 100 may be composed of a single apparatus or plurality of apparatuses. Some components of the information processing apparatus 100 may be omitted.

The processor 110 shown in FIG. 12 is the same as or similar to that shown in FIG. 4, except that the control program PR1c is executed instead of the control program PR1a shown in FIG. 4. The processor 110 acts as a hint provider 120c by reading the control program PR1c from the memory 160 and executing the program.

The hint provider 120c provides usage hints of the information processing apparatus 100 to the user, as well as the hint provider 120a shown in FIG. 4. Specifically, the hint provider 120c estimates, based on the log, one or more hint items including hints sought by the user, and displays the hint items with high likelihood of the estimation result. Examples of functional blocks of the hint provider 120c shown in FIG. 12 include a detector 152 in addition to the file acquirer 130, the estimation model acquirer 132, the log acquirer 140, the first estimation model 142, the second estimation model 144, the finder 146, the hint display controller 149, and the estimation model learner 150. That is, the information processing apparatus 100 includes the detector 152 in addition to the file acquirer 130, the estimation model acquirer 132, the log acquirer 140, the first estimation model 142, the second estimation model 144, the finder 146, the hint display controller 149 and the estimation model learner 150.

The file acquirer 130, the estimation model acquirer 132, the log acquirer 140, the first estimation model 142, the second estimation model 144, the finder 146, the hint display controller 149 and the estimation model learner 150 shown in FIG. 12 are the same as those shown in FIG. 4. The hint display controller 149 shown in FIG. 12 is the same as that shown in FIG. 4 except for the following. For each of the hints, a first display condition is defined in advance, and a hint that satisfies the corresponding first display condition is displayed, independent from a condition in which a hint item, in which the first evaluation value is the first predetermined value or greater, is displayed. In FIG. 12, description of the detector 152 will be given with a focus on the difference between the hint provider 120c and the hint provider 120a shown in FIG. 4.

The detector 152 detects one or more hints, each of which satisfies the corresponding first display condition that is defined in advance, independent from a condition in which a hint item, in which the first evaluation value is the first predetermined value or greater, is displayed. If one or more hints, each of which satisfies the corresponding first display condition are detected, the detector 152 stores the hint IDs indicative of the detected respective hints in the memory 160 or the storage 162. Alternatively, if one or more hints, each of which satisfies the corresponding first display condition, are detected, the detector 152 may notify the hint display controller 149 of the hint IDs indicative of the detected hints. An example of the first display condition refers to a condition that is obtained by combining a display event with a display condition registered in the database file DBFa shown in FIG. 5.

In one example, for each sub-item, the following value (i) or (ii) is set as a display event:
(i) a value that is obtained from the operating system, and
(ii) a value that is obtained from an application installed in the information processing apparatus 100.

Specifically, the following are set to display an event in accordance with the content of each of the sub-items: a screen tap, a screen transition, a screen rotation, a transition of battery level to a predetermined level or lower, a switching of a screen, a launch of an application, addition/removal of an application, closing of a dialog, a calling state, addition/removal of a media, switching ON/OFF of Wi-Fi, notification, and the like.

In one example, for each sub-item, a value that is obtained from the information processing apparatus 100 is set as a display condition. Specifically, for each sub-item, the following are set to a display condition: a screen rotation, screen brightness level, a network status, volume level, an operating system version, a foreground application, information on a tapped text, notification content, a Universal Serial Bus (USB) connection type, the current display screen, calling state, battery level, number of times the application has been launched, number of times the application has been used, application installation information, application display screen, and account settings for a given service and the like.

For example, the display event may be a launch of the assistance application, in which case, the display event corresponds to the sub-item "Set up Email" one level down in the hint item "Email". The display condition may be a condition in which an Email application is launched five times. In this case, the first display condition of "Set up Email" is a condition in which the Email application is launched five times or more within a given time at a timing of the launch of the assistance application. In this case, if the Email application is launched five times or more within the given time at a timing of the launch of the assistance application, the detector 152 detects "Set up Email" as a hint that satisfies the first display condition.

Similar to the hint display controller 148 shown in FIG. 4, the hint display controller 149 displays on the output device one or more hint items, in each of which the first evaluation value is the first predetermined value or greater, from among the hint items. If at least one hint item is selected by the user from among the displayed hint items, the hint display controller 149 displays on the output device one or more sub-items included in the hint item selected by the user from among the sub-items, based on the second evaluation values. Furthermore, if one or more hints, in each of which the corresponding first display condition are detected, the hint display controller 149 displays on the output device the detected hint items.

The server apparatus 200 shown in FIG. 12 has the same configuration as the server apparatus 200 shown in FIG. 4. The server apparatus 200 includes the processor 210, the memory 260, and the communication apparatus 270. The processor 210 acts as the estimation model generator 220a by reading the control program PR2a from the memory 260 and executing the program.

The configuration of the information processing apparatus 100 and the server apparatus 200 is not limited to the example shown in FIG. 12. One or some of the file acquirer 130, the estimation model acquirer 132 and the estimation model learner 150 may be omitted from the information processing apparatus 100. Instead of the finder 146, the information processing apparatus 100 may include the finder 147 shown in FIG. 10. In this case, if there is a hint item in which the first evaluation value is the second predetermined value or greater, the hint display controller 149 displays, on the output device, in order from highest to lowest of the second evaluation value, the sub-items included in the hint item in which the first evaluation value is the second predetermined value or greater, as described in FIG. 10 and the other drawings.

Figure 13:
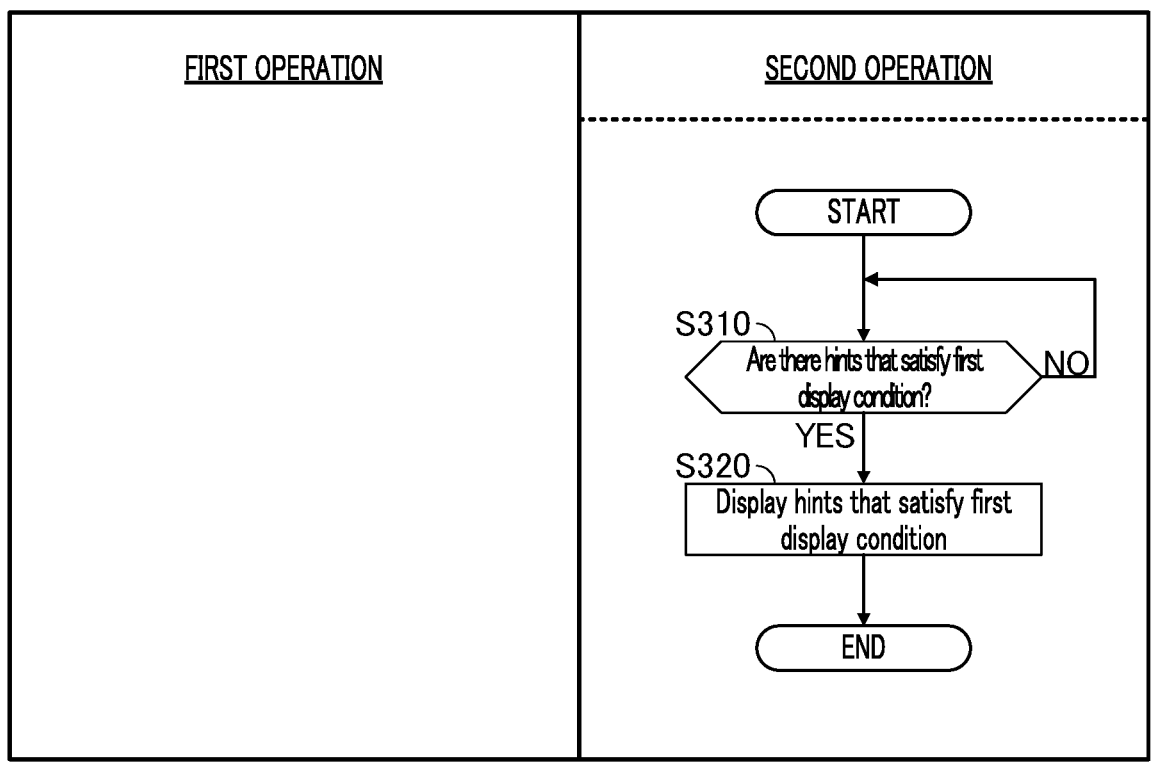
FIG. 13 is a flowchart showing an example of operation of the information processing apparatus shown in FIG. 12.

FIG. 13 is a flowchart showing an example of operation of the information processing apparatus 100 shown in FIG. 12. The operation shown in FIG. 13 is an example of a hint provision method. In the example shown in FIG. 13, the information processing apparatus 100 executes first operation and second operation in parallel. The first operation is the same as that shown in FIG. 7. Accordingly, description of the second operation will be given in FIG. 13.

In step S310, the processor 110 acts as the detector 152, and determines whether there are one or more hints, each of which satisfies the corresponding first display condition. If there are no hints, each of which satisfies the corresponding first display condition, the operation of the information processing apparatus 100 is returned to step S310. In contrast, if the hints exist, the operation of the information processing apparatus 100 is moved to step S320.

In step S320, the processor 110 acts as the hint display controller 149, and displays on the output device one or more hints, each of which satisfies the corresponding first display condition. Here, a case is given in which a hint that satisfies the first display condition, which differs from the condition in which the estimation result obtained by the first estimation model 142 is displayed. Even in such a case, in the operation shown in FIG. 13, the usability of the information processing apparatus 100 is improved because the hints are provided to the user. The operation of the information processing apparatus 100 is not limited to the example shown in FIG. 13. For example, the first operation may be the operation shown in FIG. 8 or may be the operation shown in FIG. 11.

In the fourth embodiment, the same effect is provided similarly to the second embodiment. In the fourth embodiment, the information processing apparatus 100 includes the detector 152. The detector 152 detects one or more hints, each of which satisfies the corresponding first display condition that is defined in advance. If one or more hints, each of which satisfies the corresponding first display condition is detected, the hint display controller 149 displays on the output device the hints. Here, a case is given in which a hint that satisfies the first display condition, which differs from the condition in which the estimation result obtained by the first estimation model 142 is displayed. In the fourth embodiment, even in such a case, the usability of the information processing apparatus 100 is improved, because the hints are provided to the user.

5. Fifth Embodiment

The main point of difference between the fifth embodiment and the foregoing fourth embodiment is as follows. A second display condition that is looser than the first display condition is provided. If a second evaluation value of a sub-item corresponding to a hint that satisfies the second display condition is a third predetermined value or greater, the hint that satisfies the second display condition is displayed.

Figure 14:
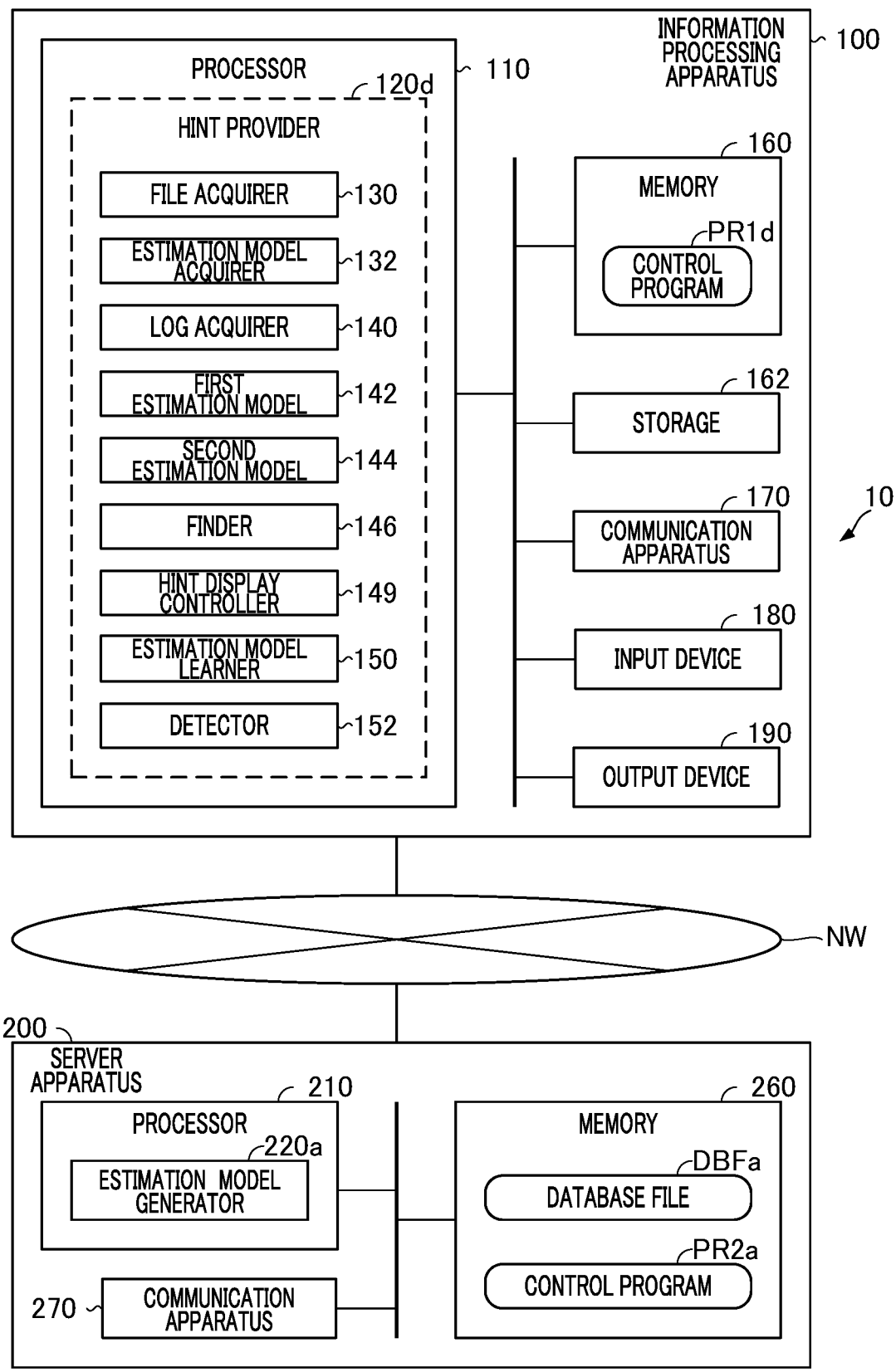
FIG. 14 is a block diagram showing the overall configuration of the system according to a fifth embodiment of the present invention.

FIG. 14 is a block diagram showing the overall configuration of the information processing apparatus 100 according to the fifth embodiment of the present invention. The same or similar components described in FIGS. 1 to 13 will be denoted by the same reference signs, and detailed description will be omitted. The system 10 shown in FIG. 14 has the same configuration as that shown in FIG. 12. The system 10 includes the information processing apparatus 100, the network NW and the server apparatus 200.

The information processing apparatus 100 shown in FIG. 14 has the same configuration as that shown in FIG. 12. The information processing apparatus 100 is realized by a computer system that includes the processor 110, the memory 160, the storage 162, the communication apparatus 170, the input device 180 and the output device 190. However, the control program PR1d stored in the memory 160 differs from the control program PR1c shown in FIG. 12. Each element of the information processing apparatus 100 is interconnected by a single bus or multiple buses. Each component of the information processing apparatus 100 may be composed of a single apparatus or a plurality of apparatuses. Some components of the information processing apparatus 100 may be omitted.

The processor 110 shown in FIG. 14 is the same as or similar to that shown in FIG. 12 except that the control program PR1d is executed instead of the control program PR1c shown in FIG. 12. The processor 110 acts as a hint provider 120d by reading the control program PR1d from the memory 160 and executing the program.

The hint provider 120d provides usage hints of the information processing apparatus 100 to the user, as well as the hint provider 120c shown in FIG. 12. Specifically, the hint provider 120d estimates, based on the log, one or more hint items including hints sought by the user, and displays the hint items with high likelihood of the estimation result. Examples of functional blocks of the hint provider 120d shown in FIG. 12 include a detector 153 in addition to the file acquirer 130, the estimation model acquirer 132, the log acquirer 140, the first estimation model 142, the second estimation model 144, the finder 146, the hint display controller 149, and the estimation model learner 150. That is, the information processing apparatus 100 includes the detector 153, in addition to the file acquirer 130, the estimation model acquirer 132, the log acquirer 140, the first estimation model 142, the second estimation model 144, the finder 146, the hint display controller 149 and the estimation model learner 150.

The file acquirer 130, the estimation model acquirer 132, the log acquirer 140, the first estimation model 142, the finder 146, the hint display controller 149, and the estimation model learner 150 shown in FIG. 14 are the same as those shown in FIG. 12. The second estimation model 144 shown in FIG. 14 is the same as that shown in FIG. 12. However, the operation carried out by the second estimation model 144 is excluded in which there exists a hint that satisfies the second display condition, which is looser than the first display condition. The hint display controller 149 shown in FIG. 14 is the same as that shown in FIG. 12. However, the operation carried out by the hint display controller 149 is excluded in which a second evaluation value of a sub-item corresponding to a hint that satisfies the second display condition is the third predetermined value or greater. In FIG. 14, description of the detector 153 will be given with a focus on the difference between the hint provider 120d and the hint provider 120c shown in FIG. 12.

The detector 153 detects one or more hints, each of which satisfies the corresponding first display condition, similarly to the detector 153 shown in FIG. 12. Furthermore, the detector 153 detects one or more hints, each of which satisfies the corresponding second display condition, which is looser than the first display condition. That is, the detector 153 detects one or more hints, each of which satisfies the following condition, independent from the condition in which a hint item that is the first evaluation value or greater is displayed. Specifically, for each of a plurality of hints, a second display condition that is looser than the first display condition is defined. The detector 153 detects (i) one or more hints, each of which satisfies the corresponding second display condition as well as (ii) one or more hints, each of which satisfies the corresponding first display condition. If one or more hints, each of which satisfies the corresponding second display condition, are detected, the detector 153, in the memory 160 or the storage 162, stores, for each hint, a hint ID indicative of a hint that satisfies the corresponding second display condition. Alternatively, if a hint that satisfies the corresponding second display condition is detected, the detector 153 may notify the second estimation model 144 of the hint ID.

For example, a first display condition may be a condition in which the Email application is launched five times or more at a timing of the launch of the assistance application. In this case, a second display condition of the sub-item "Set up Email" one level down in the hint item "Email" is a condition in which the Email application is launched "h" times or more at a timing of the launch of the assistance application. The "h" is an integer that is equal to or greater than 1 and equal to or less than 4. Description will be given in a case in which "h" is 3. If the Email application is launched three times or more within the given time at a timing of the launch of the assistance application, the detector 153 detects "Set up Email" as a hint that satisfies the second display condition. The second display condition is registered in the display condition in the database file DBFa. The second display condition of the sub-item "Set up Email" of the hint item "Email" is not limited to the foregoing example.

The second estimation model 144 calculates one or more second evaluation values, each of which corresponds to the sub-item linked with a hint that satisfies the corresponding second display condition. Specifically, the second estimation model 144 calculates a second evaluation value of each of sub-items registered in the database file DBFa, by use of the log acquired by the log acquirer 140. Then, the second estimation model 144 links with the corresponding hint ID each of the second evaluation values of the sub-items, each of the sub-items corresponding to a hint that satisfies the corresponding second display condition. The second estimation model 144 stores the result of the linking in the memory 160 or the storage 162. Alternatively, the second estimation model 144 may link with the corresponding hint ID each of the second evaluation values, and may notify the hint display controller 149 of the corresponding result.

Similar to the hint display controller 149 shown in FIG. 12, the hint display controller 149 displays on the output device one or more hint items, in each of which the first evaluation value is the first predetermined value or greater, from among the hint items. Then if any item is selected by the user from among the displayed hint items, the hint display controller 149 displays on the output device one or more sub-items that are included in the hint item selected by the user, based on the second evaluation values. Furthermore, the hint display controller 149 displays on the output device one or more hints, each of which satisfies the corresponding second condition, if the corresponding second evaluation of the sub-item, which corresponds to the hint which satisfies the second display condition, is the third predetermined value or greater. If one or more hints, each of which satisfies the corresponding first display condition, are detected, the hint display controller 149 displays the hints.

The server apparatus 200 shown in FIG. 14 has the same configuration as that shown in FIG. 12. The server apparatus 200 includes the processor 210, the memory 260, and the communication apparatus 270. The processor 210 acts as the estimation model generator 220a by reading the control program PR2a from the memory 260 and executing the program.

The configuration of the information processing apparatus 100 and the server apparatus 200 is not limited to the example shown in FIG. 14. One or some of the file acquirer 130, the estimation model acquirer 132 and the estimation model learner 150 may be omitted from the information processing apparatus 100. Instead of the finder 146, the information processing apparatus 100 may include the finder 147 shown in FIG. 10. In this case, if there is a hint item in which the first evaluation value is the second predetermined value or greater, the hint display controller 149 displays, on the output device, in order from highest to lowest of the second evaluation value, the sub-items included in the hint item in which the first evaluation value is the second predetermined value or greater, as described in FIG. 10 and other drawings.

Figure 15:
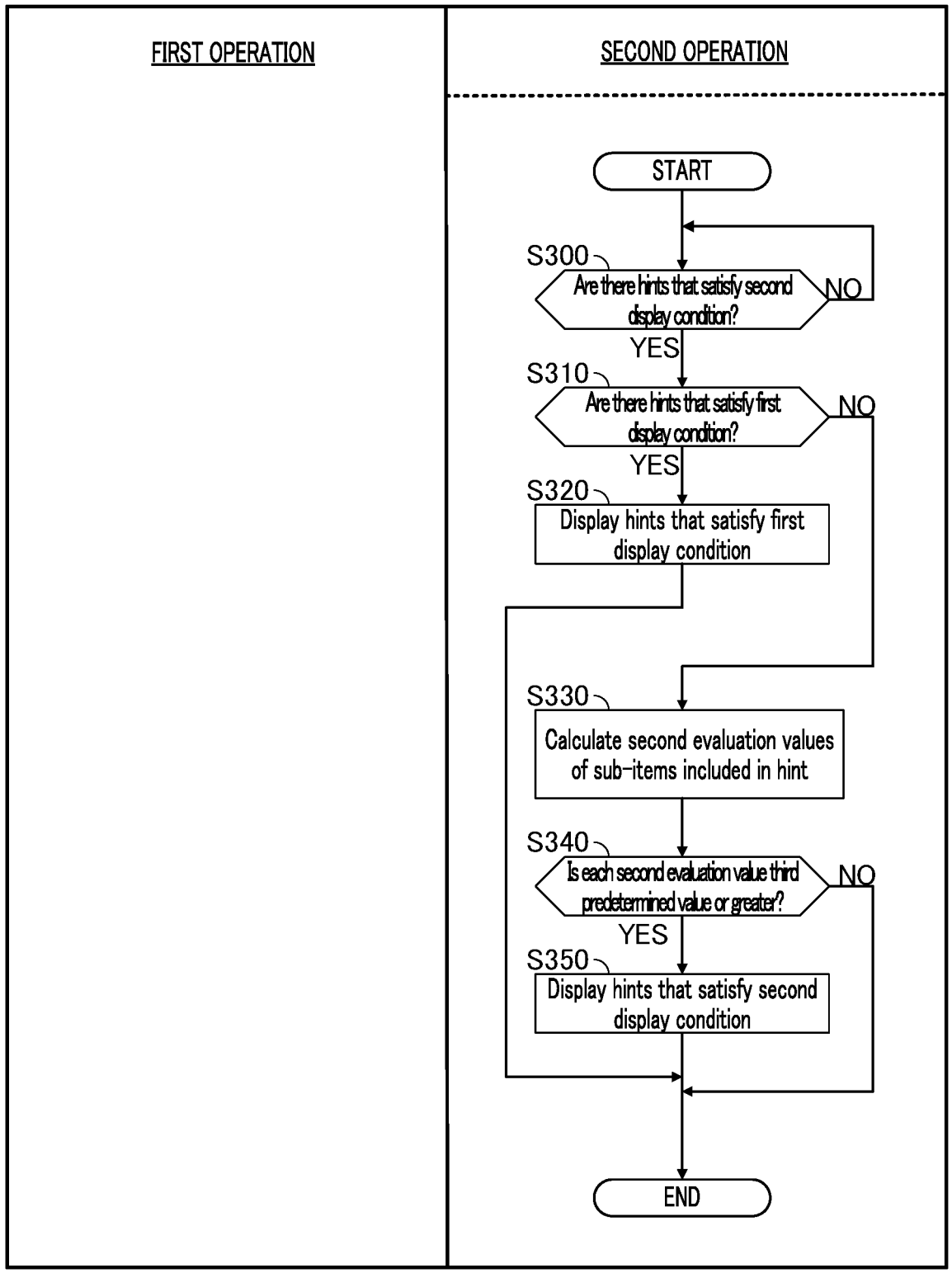
FIG. 15 is a flowchart showing an example of operation of the information processing apparatus shown in FIG. 14.

FIG. 15 is a flowchart showing an example of operation of the information processing apparatus 100 shown in FIG. 14. The operation shown in FIG. 15 is an example of a hint provision method. In the example shown in FIG. 15, the information processing apparatus 100 executes the first operation and the second operation in parallel. The first operation is the same as that shown in FIG. 7. Accordingly, description of the second operation will be given in FIG. 15.

In step S300, the processor 110 acts as a detector 153, and determines whether one or more hints, each of which satisfies the corresponding second display condition, exist. If there are no hints, each of which satisfies the corresponding second display condition, the operation of the information processing apparatus 100 is returned to step S300. In contrast, if a hint exists, the operation of the information processing apparatus 100 is moved to step S310.

In step S310, the processor 110 acts as the detector 153, and determines whether there are one or more hints, each of which satisfies the corresponding first display condition. If there are no hints, each of which satisfies the corresponding first display condition, the operation of the information processing apparatus 100 is moved to step S330. In contrast, if the hints exist, the operation of the information processing apparatus 100 is moved to step S320.

In step S320, the processor 110 acts as the hint display controller 149, and displays on the output device one or more hints, each of which satisfies the corresponding first display condition, and ends the second operation.

In step S330, the processor 110 acts as the second estimation model 144, and calculates one or more second evaluation values, each of which corresponds to the sub-item linked with a hint that satisfies the corresponding second display condition. For example, the processor 110 functions to be the log acquirer 140. Upon detection of one or more hints, each of which satisfies the corresponding second display condition, and the processor 110 obtains the log from the memory 160 or the storage 162. Then, the second estimation model 144 calculates a second evaluation value for each of the sub-items registered in the database file DBFa, by use of the log. The second estimation model 144 links with the corresponding hint ID each of the second evaluation values of the sub-items, each of the sub-items corresponding to a hint that satisfies the corresponding second display condition. The second estimation model 144 stores the result of the linking in the memory 160 or the storage 162.

Next, in step S340, the processor 110 determines whether, for each sub-item, which corresponds to the hint that satisfies the corresponding second display condition, a second evaluation value is the third predetermined value or greater. The third predetermined value may be or may not be the same as the first predetermined value used in the first processing, or it may be a different value. If a second evaluation value of the sub-item, which corresponds to the hint which satisfies the corresponding second display condition, is the third predetermined value or greater, the operation of the information processing apparatus 100 is moved to step S350. In contrast, if the second evaluation value is less than the third predetermined value, the second operation ends.

In step S350, the processor 110 acts as the hint display controller 149, and displays one or more hints, each of which satisfies the corresponding second display condition, and ends the second operation. In the operation shown in FIG. 15, one or more hints are provided to the user, even if a second evaluation value of the hint is the third predetermined value or greater. Here, the hint satisfies the corresponding second display condition, and the corresponding second display condition is looser than the first display condition. Therefore, the operation shown in FIG. 15 can provide a hint sought by the user more efficiently than the operation shown in FIG. 13. Therefore, the usability of the information processing apparatus 100 is improved. The operation of the information processing apparatus 100 is not limited to the example shown in FIG. 15. For example, the first operation may be that shown in FIG. 8 or may be that shown in FIG. 11.

In the fifth embodiment, the same effect is provided similarly to the fourth embodiment. In the fifth embodiment, the information processing apparatus 100 includes the detector 153. For each of a plurality of hints, a second display condition that is looser than the first display condition is defined. The detector 153 detects the following (i) and (ii):
(i) one or more hints, each of which satisfies the corresponding second display condition, and
(ii) one or more hints, each of which satisfies the corresponding first display condition.

The second estimation model 144 calculates one or more second evaluation values, each of which corresponds to the sub-item linked with a hint that satisfies the corresponding second display condition. Then, the hint display controller 149 displays on the output device one or more hints, each of which satisfies the corresponding second condition, if the corresponding second evaluation of the sub-item, which corresponds to the hint which satisfies the second display condition, is the third predetermined value or greater. In the fifth embodiment, one or more hints are provided to the user, even if a second evaluation value of the hint is the third predetermined value or greater. Here, the hint satisfies the corresponding second display condition, and the corresponding second display condition is looser than the first display condition. Therefore, the usability of the information processing apparatus 100 is improved.

6. Sixth Embodiment

The main point of differences between the sixth embodiment and the foregoing fifth embodiment is as follows.
(i) A hint which the number of times of displaying exceeds an upper limit, which is provided in advance, is not displayed.
(ii) A feedback value is transferred to the server apparatus 200.

Figure 16:
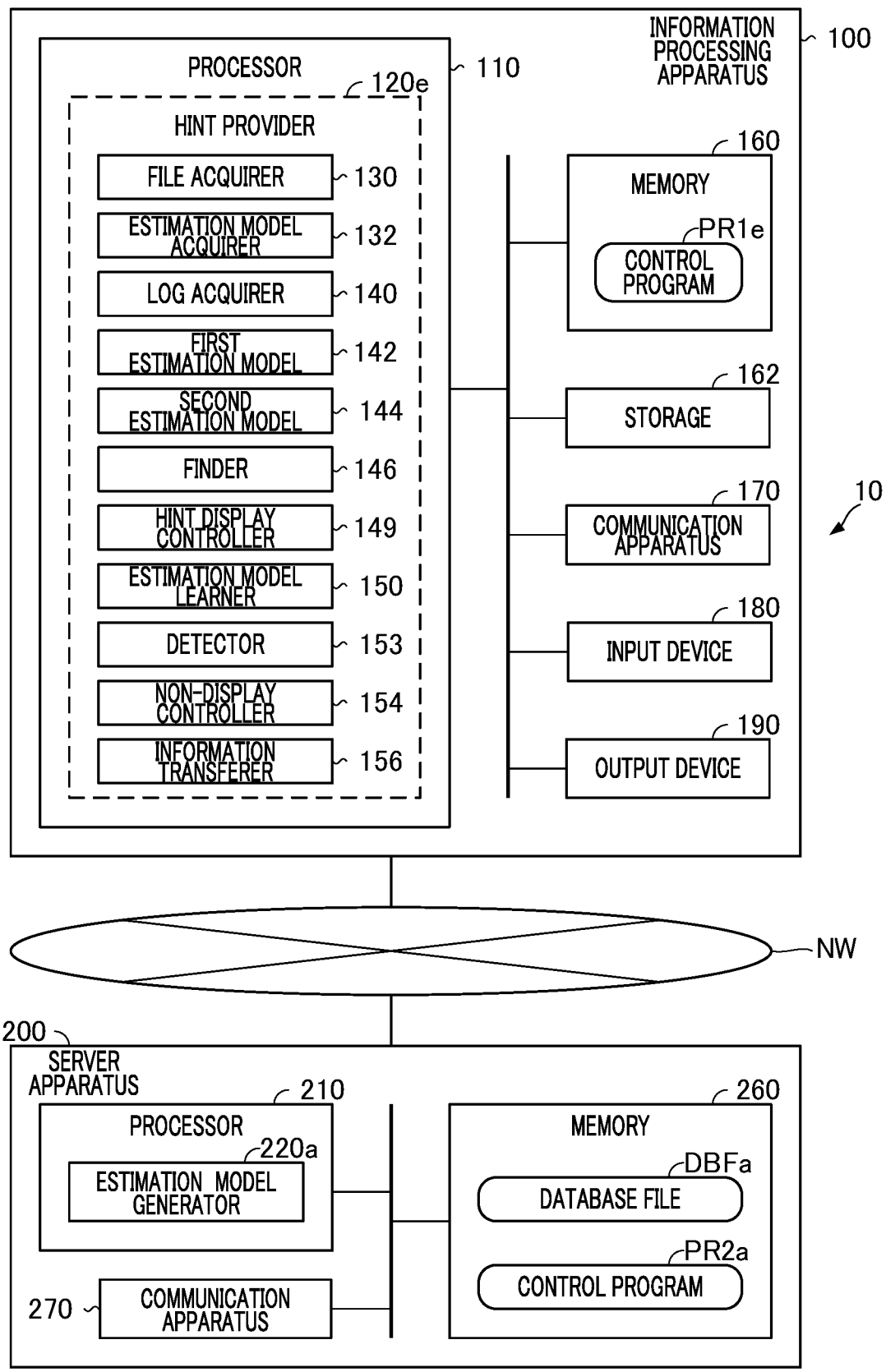
FIG. 16 is a block diagram showing the overall configuration of the system according to a sixth embodiment of the present invention.

FIG. 16 is a block diagram showing the overall configuration of the information processing apparatus 100 according to the sixth embodiment of the present invention. The same or similar components described in FIGS. 1 to 15 will be denoted by the same reference signs, and detailed description will be omitted. The system 10 shown in FIG. 16 has the same configuration as that shown in FIG. 14. The system 10 includes an information processing apparatus 100, a network NW and a server apparatus 200.

The information processing apparatus 100 shown in FIG. 16 has the same configuration as the information processing apparatus 100 shown in FIG. 14. The information processing apparatus 100 is realized by a computer system that includes a processor 110, a memory 160, a storage 162, a communication apparatus 170, an input device 180 and an output device 190. However, the control program PR1e stored in the memory 160 differs from the control program PR1d shown in FIG. 14. Components of the information processing apparatus 100 are interconnected by a single bus or multiple buses for communicating information. Each component of the information processing apparatus 100 may be composed of a single apparatus or plurality of apparatuses. Some components of the information processing apparatus 100 may be omitted.

The processor 110 shown in FIG. 16 is the same as or similar to that shown in FIG. 14, except that the control program PR1e is executed instead of the control program PR1d shown in FIG. 14. The processor 110 acts as a hint provider 120e by reading the control program PR1e from the memory 160 and executing the program.

The hint provider 120e provides usage hints of the information processing apparatus 100 to the user, as well as the hint provider 120d shown in FIG. 14. Specifically, the hint provider 120e estimates, based on the log, one or more hint items including hints sought by the user, and displays the hint items with high likelihood of the estimation result. Examples of functional blocks of the hint provider 120e shown in FIG. 14 include a non-display controller 154 and an information transferer 156, in addition to the file acquirer 130, the estimation model acquirer 132, the log acquirer 140, the first estimation model 142, the second estimation model 144, the finder 146, the hint display controller 149, the estimation model learner 150 and the detector 153. That is, the information processing apparatus 100 includes the non-display controller 154 and the information transferer 156, in addition to the file acquirer 130, the estimation model acquirer 132, the log acquirer 140, the first estimation model 142, the second estimation model 144, the finder 146, the hint display controller 149, the estimation model learner 150 and the detector 153.

The file acquirer 130, the estimation model acquirer 132, the log acquirer 140, the first estimation model 142, the second estimation model 144, the finder 146, the hint display controller 149, the estimation model learner 150 and the detector 153 shown in FIG. 16 are the same as those shown in FIG. 14. In FIG. 16, description of the non-display controller 154 and the information transferer 156 will be given with a focus on the difference between the hint provider 120e and the hint provider 120d shown in FIG. 14.

The non-display controller 154 counts the number of times of displaying each of a plurality of hints, and stops displaying a hint which the number of times of displaying exceeds the predetermined upper limit. If the same hint is displayed more than once until the number of times to display the hint reaches the upper limit, there is an increase in the likelihood that the user will remember the content of the hint. In this case, repeat displaying of the content of the hint which the user knows may reduce the usability of the information processing apparatus 100. In the information processing apparatus 100 shown in FIG. 16, a hint which is displayed a number of times exceeds the upper limit is not displayed by the non-display controller 154. Accordingly, the usability of the information processing apparatus 100 is improved. The upper limit may be freely selectable according to the literacy of the user.

The information transferer 156 transfers to the server apparatus 200 feedback information indicative of a result of the user's input operation to the displayed hint items. An example of the feedback information is the same as the information which the estimation model learner 150 feeds back to the first estimation model 142 and the second estimation model 144 (e.g., the feedback values of FIG. 7, the first and second feedback values of FIG. 8, etc.).

The server apparatus 200 shown in FIG. 16 has the same configuration as that shown in FIG. 14. The server apparatus 200 includes the processor 210, the memory 260, and the communication apparatus 270. The processor 210 acts as the estimation model generator 220a by reading a control program PR2a from the memory 260 and executing the program. For example, the estimation model generator 220a feeds back the feedback information transferred from the information processing apparatus 100 to the first estimation model 142 and the second estimation model 144, to cause the first estimation model 142 and the second estimation model 144 to be learned. Accordingly, the accuracy of the estimations of the first estimation model 142 and the second estimation model 144, which are generated by the estimation model generator 220a, is improved.

The configuration of the information processing apparatus 100 and the server apparatus 200 is not limited to the example shown in FIG. 16. Either one of the non-display controller 154 or the information transferer 156 may be omitted from the information processing apparatus 100. One or some of the file acquirer 130, the estimation model acquirer 132, the estimation model learner 150 and the detector 153 may be omitted from the information processing apparatus 100. Instead of the finder 146, the information processing apparatus 100 may include the finder 147 shown in FIG. 10. In this case, if there is a hint item in which the first evaluation value is the second predetermined value or greater, the hint display controller 149 displays, on the output device, in order from highest to lowest of the second evaluation value, the sub-items included in the hint item, as described in FIG. 10 and the other drawings. Alternatively, the information processing apparatus 100 may include the detector 152 shown in FIG. 12 instead of the detector 153.

Figure 17A:
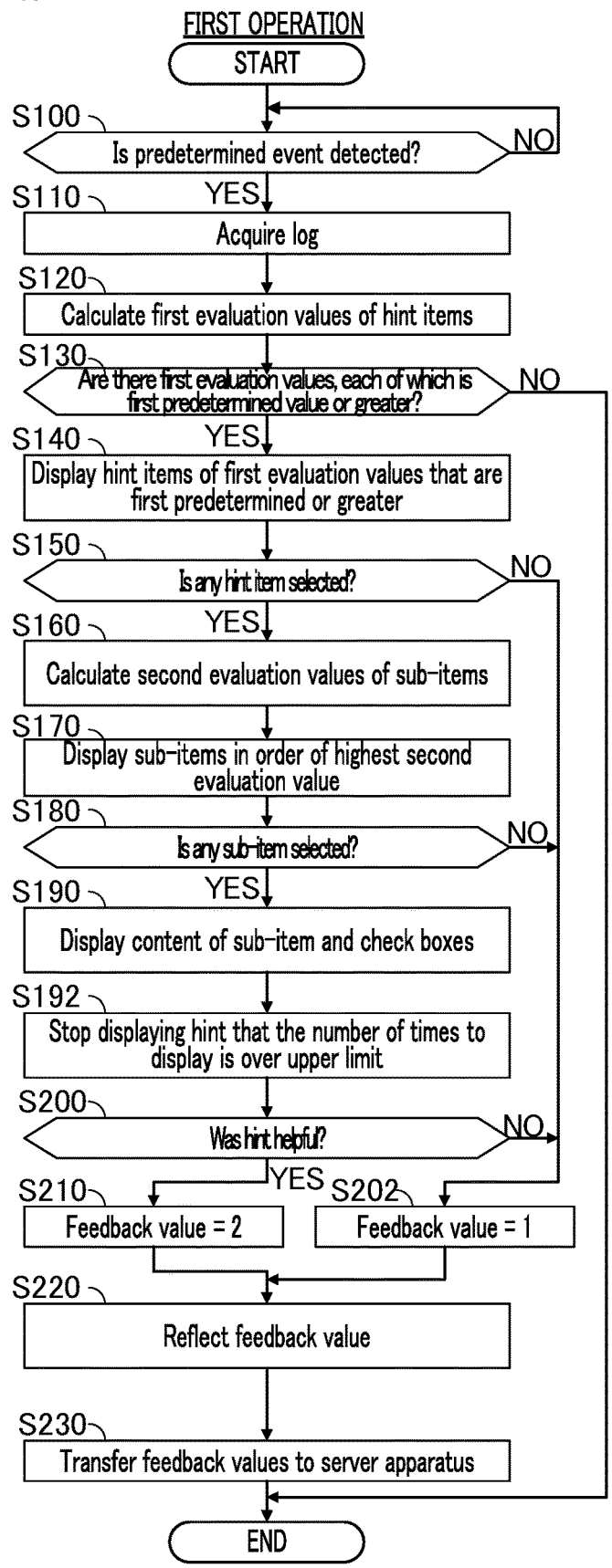
FIG. 17A is a flowchart showing an example of the operation of the information processing apparatus shown in FIG. 16.
Figure 17B:
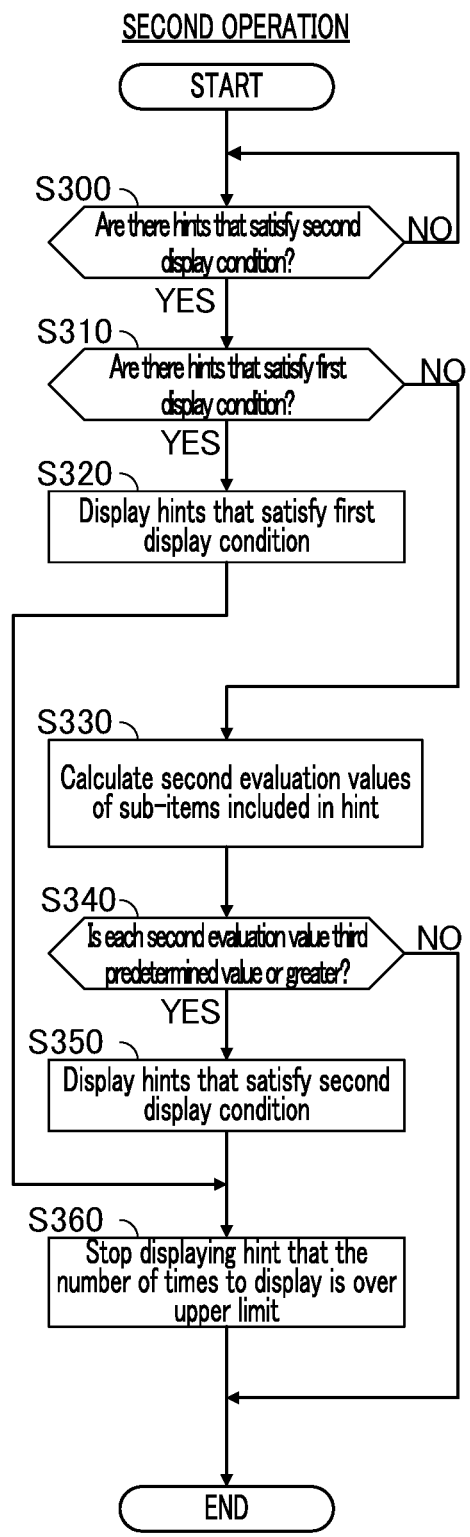
FIG. 17B is a flowchart showing an example of operation of the information processing apparatus shown in FIG. 16.

FIG. 17A and FIG. 17B are flowcharts showing an example of operation of the information processing apparatus 100 shown in FIG. 16. The operation shown in FIG. 17A and FIG. 17B is an example of a hint provision method. In the example shown in FIG. 17A and FIG. 17B, the information processing apparatus 100 executes a first operation and a second operation in parallel. The first operation is the same as that shown in FIG. 7, except that steps S192 and S230 are added to the operation shown in FIG. 7. The second operation is the same as that shown in FIG. 15, except that step S360 is added to the second operation shown in FIG. 15. Accordingly, in FIG. 17A, description of the first operation will be given with a focus on steps S192 and S230. In FIG. 17B, description of the second operation will be given with a focus on step S360.

First, the first operation will be described. Step S192 is executed after step S192, and step S230 is executed after step S220.

In step S192, the processor 110 acts as the non-display controller 154, and stops displaying a hint which the number of times of displaying has exceeded the upper limit. The non-display controller 154 counts the number of times to display hints in step S190. If the number of times to display hints displayed in step S190 exceeds the upper limit, the non-display controller 154 stops the subsequent display of the hints displayed in step S190. Accordingly, repeat displaying of the same hint above the upper limit is avoided. After step S192, step S200 is executed.

In step S230, the processor 110 acts as the information transferer 156, and transfers the feedback values set in step S202 or in step S210 to the server apparatus 200. That is, the information transferer 156 notifies the server apparatus 200 of the user's reaction to the content of the display. Accordingly, the server apparatus 200 is able to cause the first and second estimation models 142 and 144 to learn the user's reaction to the content of the display. With the completion of step S230, the first operation ends.

Next, the second operation will be described. Step S360 is executed after step S320 or step S350.

In step S360, the processor 110 acts as the non-display controller 154. Similar to step S192, the processor 110 stops displaying a hint which the number of times of displaying has exceeded the upper limit. Specifically, the non-display controller 154 counts the number of times of displaying hints that have been displayed in step S320 or counts the number of times of displaying hints that have been displayed in step S350. If the number of times of displaying hints exceeds the upper limit, the non-display controller 154 stops the subsequent display of the hints above the upper limit. The second operation ends with the completion of step S360.

The operation of the information processing apparatus 100 is not limited to the examples shown in FIGS. 17A and 17B. For example, step S192 may be executed after step S230. Furthermore, the first operation may be an operation in which steps S192 and S230 are added to the operation shown in FIG. 8, or may be an operation in which steps S192 and S230 are added to the operation shown in FIG. 11. The second operation may be an operation in which step S360 is added to the second operation shown in FIG. 13.

Figure 18:
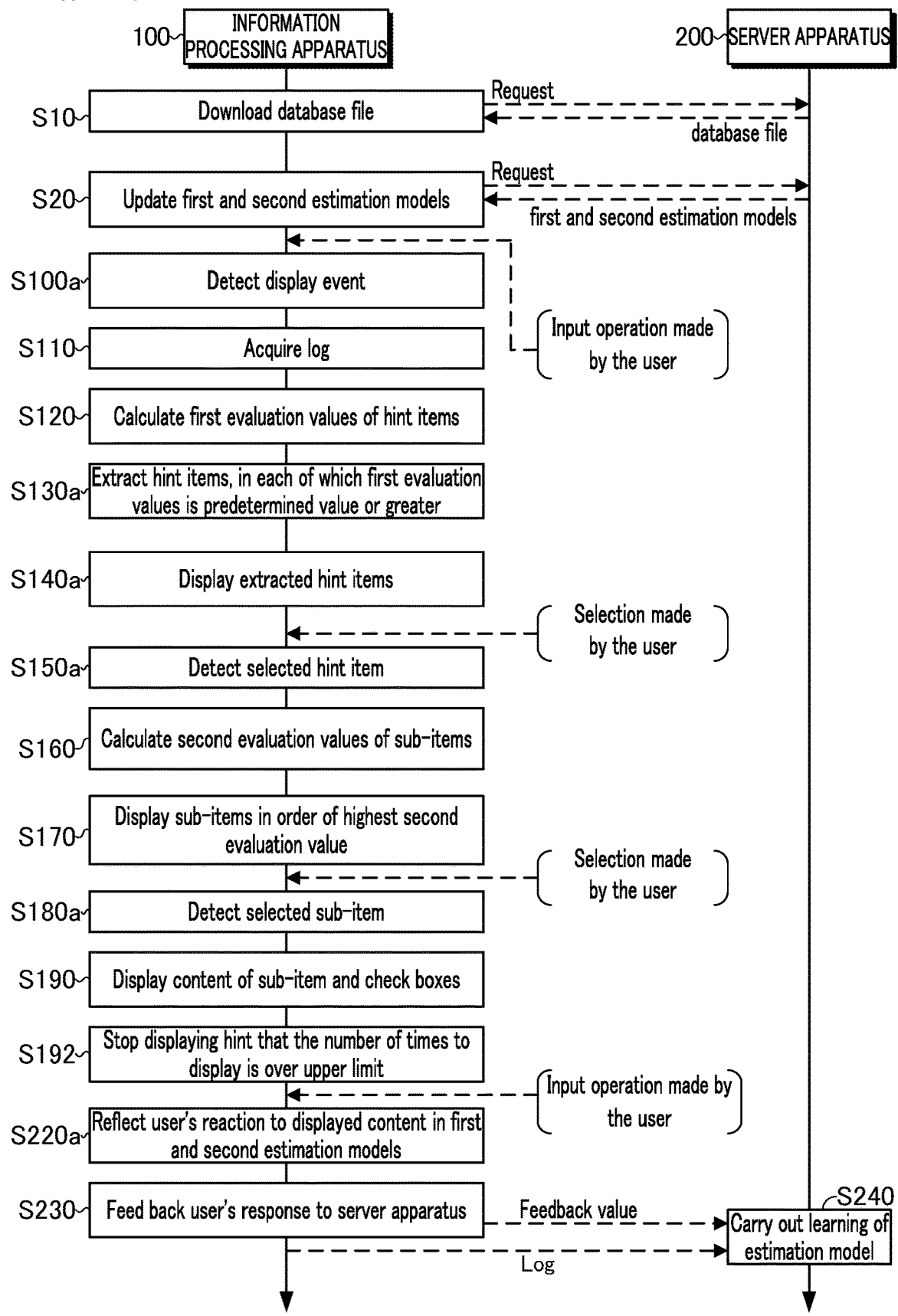
FIG. 18 is a sequence chart showing an example of the operation of the system shown in FIG. 16.

FIG. 18 is a sequence chart showing an example of the operation of the system 10 shown in FIG. 16. FIG. 18 shows an example of the operation of the system 10 in the first operation shown in FIG. 17A. In the operation shown in FIG. 18, steps S192 and S230 are added to the operation of the information processing apparatus 100 shown in FIG. 9. Step S240 is added to the operation of the server apparatus 200 shown in FIG. 9. The other operation of the information processing apparatus 100 and the server apparatus 200 are the same as that shown in FIG. 9. Accordingly, in FIG. 18, description of the operation of the information processing apparatus 100 will be given with a focus on the process of steps S192 and S230. In addition, description of the operation of the server apparatus 200 will be given with a focus on step S240.

In step S192, the information processing apparatus 100 stops displaying a hint which the number of times of displaying exceeds the upper limit. For example, information processing apparatus 100 counts the number of times to display hints that have been displayed in step S190. If the number of times to display hints displayed in step S190 exceeds the upper limit, the information processing apparatus 100 stops the subsequent display of the hints displayed in step S190.

Next, in step S220a, as described in FIG. 9, upon receiving the user's input operation of filling a check in a check box, the information processing apparatus 100 reflects the user's reaction to the displayed content in the first estimation model 142 and the second estimation model 144.

Next, in step S230, the information processing apparatus 100 feeds back, to the server apparatus 200, the user's response to the content of the display. If the user filled a check in the check box "Yes" as an answer to the question "Was this hint helpful?", the information processing apparatus 100 transfers, to the server apparatus 200, a feedback value indicating that the hint displayed in step S190 was helpful. In contrast, if the user filled a check in the check box "No" as an answer to the question, the information processing apparatus 100 transfers, to the server apparatus 200, a feedback value indicating that the hint displayed in step S190 was not helpful.

Next, in step S240, the server apparatus 200 carries out learning of the estimation model. The server apparatus 200 receives, from the information processing apparatus 100, a feedback value indicative of a user's reaction to the content of the display. Furthermore, the server apparatus 200 obtains a log (e.g., a log acquired by the information processing apparatus 100 in step S110) from the information processing apparatus 100. The server apparatus 200 then updates the first estimation model 142 and the second estimation model 144, based on the following:

(i) the feedback value indicative of the user's reaction to the content of the display, and
(ii) the log of the information processing apparatus 100.

Accordingly, the accuracy of the estimations of the first estimation model 142 and the second estimation model 144, which are generated by the server apparatus 200, is improved. The operation of the system 10 is not limited to the example shown in FIG. 18.

In the sixth embodiment, the same effect is provided similarly to the fifth embodiment. In the sixth embodiment, the information processing apparatus 100 includes the non-display controller 154. The non-display controller 154 counts the number of times to display each of a plurality of hints, and stops displaying a hint which the number of times of displaying has exceeded the predetermined upper limit. In this case, hints of the contents the user knows are not displayed. Therefore, the usability of the information processing apparatus 100 is improved.

The information processing apparatus 100 includes the information transferer 156. The information transferer 156 transfers feedback information indicative a result of the user's input operation on the displayed hint items to the server apparatus 200. In this case, the server apparatus 200 updates the first estimation model 142 and the second estimation model 144, based on the following:

(i) the feedback information transferred from the information processing apparatus 100, and
(ii) the log recorded in the predetermined period immediately before.

Accordingly, the accuracy of the estimations of the first estimation model 142 and the second estimation model 144, which are generated by the server apparatus 200, is improved.

7. Modifications

The present invention is not limited to the foregoing embodiments. Specific modifications will be described below. Two or more modifications freely selected from among the following examples may be combined.

First Modification

In each of the foregoing first to sixth embodiments, an example is described in which if there are one or more hint items, in each of which the first evaluation value is the predetermined first evaluation value or greater, the hint items are displayed automatically. Each of the hint items may be displayed in response to a user's input operations, as shown in FIG. 19A, FIG. 19B and FIG. 19C.

Figure 19A:
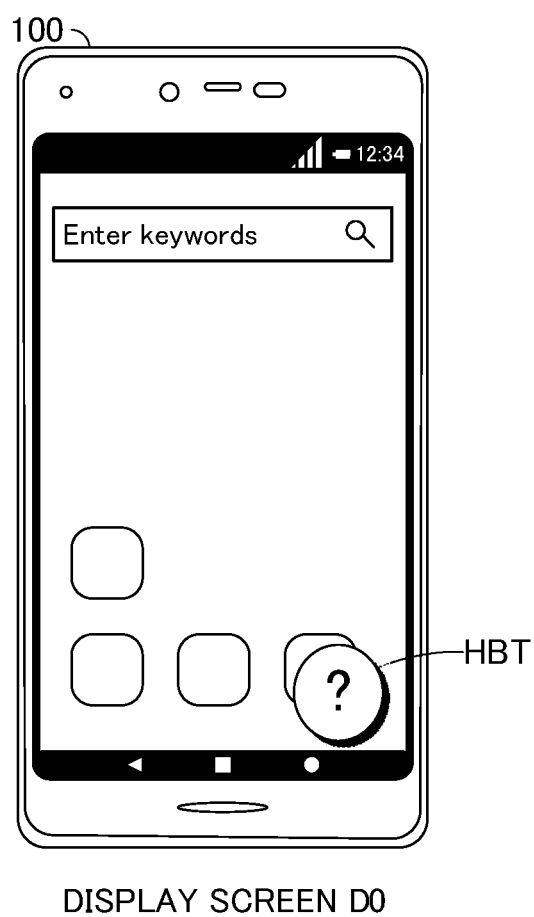
FIG. 19A is an illustration showing an overview of the operation of the information processing apparatus according to a first modification.
Figure 19B:
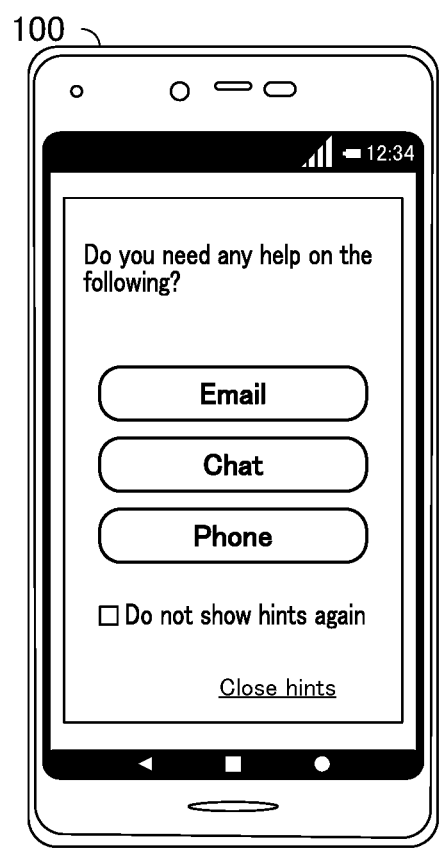
FIG. 19B is an illustration showing an overview of the operation of the information processing apparatus according to the first modification.
Figure 19C:
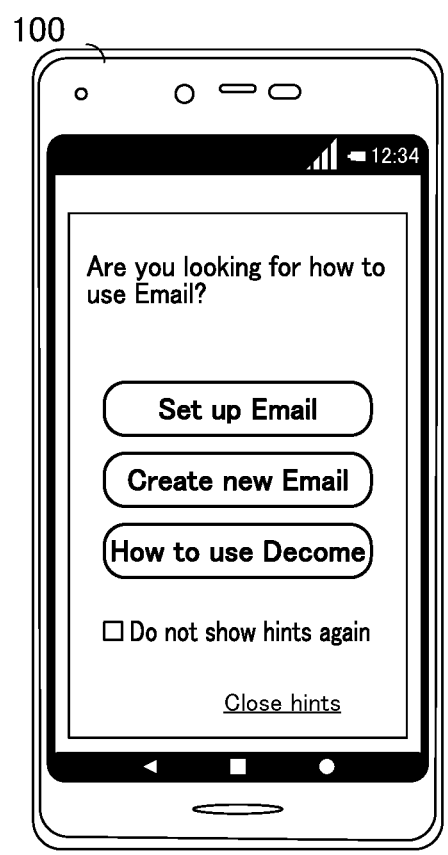
FIG. 19C is an illustration showing an overview of operation of the information processing apparatus according to the first modification.

FIG. 19A, FIG. 19B and FIG. 19C each are explanatory diagrams showing overall operation of the information processing apparatus 100 according to the first modification. The operation shown in FIGS. 19A to 19C refers to a modification of the operation shown in FIGS. 6A to 6C. Detailed description of the operation described in FIGS. 6A to 6C will be omitted.

If there are one or more hint items, in each of which the first evaluation value is 70(%) or greater, and is calculated by the first estimation model 142, the hint display controller 149 displays a hint button HBT (a display screen D0 shown in FIG. 19A). Next, when the hint button HBT is selected by the user's input operation, the hint display controller 149 displays these hint items, in each of which the first evaluation value is 70(%) or greater (a display screen D1 shown in FIG. 19B). The operation of the information processing apparatus 100 thereafter is the same as that shown in FIG. 6B and FIG. 6C.

In the first modification, the same effect is provided similarly to the first to the sixth embodiments. In the first modification, the user is able to determine the timing of displaying the hint items. Accordingly, the usability of the information processing apparatus 100 is improved.

Second Modification

In each of the foregoing second to the sixth embodiments, an example is described in which the second estimation model 144 calculates a second evaluation value of each of a plurality of sub-items by use of the log. However, the second estimation model 144 may calculate the second evaluation values by use of the following (i) and (ii):
(i) the log acquired by the log acquirer 140, and
(ii) a hint item selected by the user.

In such a case, the same effect is provided similarly to the second to the sixth embodiments.

Third Modification

In the foregoing second embodiment, an example is described in which the hint provider 120a includes the estimation model acquirer 132 and the estimation model learner 150. However, the hint provider 120 shown in FIG. 1 may include one or both the estimation model acquirer 132 and the estimation model learner 150. In this case, the estimation model acquirer 132 obtains the first estimation model 142 from the server apparatus 200. The estimation model learner 150 reflects, in the first estimation model 142, the result of the user's input operation of the displayed hint items. In the third modification, the same effect is provided similarly to the second embodiment.

Fourth Modification

In the foregoing fourth embodiment, an example is described in which the hint provider 120c includes the detector 152. However, the detector 152 may be included in the hint provider 120 shown in FIG. 1. In this case, the same effect is provided similarly to the fourth embodiment.

Fifth Modification

In the foregoing sixth embodiment, an example is described in which the hint provider 120e includes the non-display controller 154 and the information transferer 156. However, the hint provider 120 shown in FIG. 1 may include one or both the non-display controller 154 and the information transferer 156. In this case, the same effect is provided similarly to the sixth embodiment.

Sixth Modification

In the foregoing sixth embodiment, an example is described in which a hint, of which the number of times of displaying exceeds an upper limit, is not displayed. However, the feature of stopping the display of hints may be disenabled by the user's input operation. For example, the information processing apparatus 100 may store, in the memory 160 or the storage 162, a list of hints not to be displayed, and may display the list in response to the user's input operation. In the sixth modification, the same effect is provided similarly to the sixth embodiment.

Seventh Modification

In the foregoing second to sixth embodiments, an example is described in which a plurality of sub-items may be further divided into categories. In this case, for example, when the user selects a sub-item, items included in the sub-item selected by the user are further displayed. In the seventh modification, the same effect is provided similarly to the second to the sixth embodiments.

8. Other Matters (1) In the foregoing embodiments, the memory 160 is a recording medium readable by the processor 110, such as ROM and RAM. However, the memory 160 may be flexible disks, magneto-optical disks (e.g., compact disks, digital multi-purpose disks, Blu-ray (registered trademark) discs, smart cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted from a network or system via telecommunication lines.

(2) In the foregoing embodiments, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(3) In the foregoing embodiments, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other apparatuses.

(4) In the foregoing embodiments, the determination may be made in values that can be represented by one bit (0 or 1), may be made in Boolean values (true or false), or may be made by comparing numerical values (for example, comparison with a predetermined value).

(5) The order of processes, sequences, flowcharts, etc., that have been used to describe the embodiments may be changed as long as they do not conflict. For example, although a variety of methods have been illustrated in this disclosure with a variety of elements of steps in exemplary orders, the specific orders presented herein are by no means limiting.

(6) Each of functions shown in FIGS. 1, 4, 10, 12, 14 and 16 is realized by freely selected combination of at least one of hardware and software. The method of realizing each functional block is not limited thereto. That is, each functional block may be implemented by one piece of apparatus that is physically and/or logically aggregated. Alternatively, each functional block may be realized by directly and/or indirectly connecting two or more physically and/or logically separate pieces of apparatus (by using cables and/or radio, for example), and using these apparatuses. The functional block may be realized by combining the software with one apparatus described above or these apparatuses.

The communication apparatus 170 is hardware (a transmitting and receiving apparatus) for communicating between computers via at least one of a wired network and a wireless network. The communication apparatus 170 is referred to as, for example, a network apparatus, a network controller, a network card, or a communication module. The communication apparatus 170 may include a high-frequency switch, duplexers, filters, or frequency synthesizers to realize Frequency Division Duplexing (FDD) and/or Time Division Duplexing (TDD: Time Division (Duplexing).

(7) In the foregoing embodiments, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions and so forth may be transmitted and received via communication media. For example, when software is transmitted from a website, a server, or other remote sources, by using wired technologies such as coaxial cables, optical fiber cables, twisted-pair cables, and digital subscriber lines (DSL), and/or wireless technologies such as infrared radiation, radio and microwaves, etc., these wired technologies and/or wireless technologies are also included in the definition of communication media.

(8) In the foregoing aspects, the terms "system" and "network" are used interchangeably.

(9) The information and parameters described in this disclosure may be represented by absolute values, may be represented by relative values with respect to predetermined values, or may be represented by using other pieces of applicable information. For example, radio resources may be specified by predetermined indices. The names used for parameters in this specification are in no respect limiting. In addition, equations and/or the like to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(10) In the foregoing embodiments, the information processing apparatus 100 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", a "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(11) In the foregoing embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access". As used in this specification, two elements may be considered "connected" or "coupled" to each other by using one or more electrical wires, cables and/or printed electrical connections, and to name a number of non-limiting and non-inclusive examples, by using electromagnetic energy, such as electromagnetic energy having wavelengths in radio frequency regions, microwave regions and optical (both visible and invisible) regions.

(12) In the foregoing embodiments, the phrase "based on" as used in this specification does not mean "based only on", unless specified otherwise. In other words, the phrase "based on" means both "based only on" and "based at least on".

(13) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "judgment (decision)" may be replaced with "assuming", "expecting", "considering", etc.

(14) As long as terms such as "include", "comprise" and modifications of these are used in the foregoing embodiments, these terms are intended to be inclusive, in a manner similar to the way the term "provide" is used. Furthermore, the term "or" as used in this specification or in claims is not intended to be an exclusive disjunction.

(15) In the present disclosure, when articles such as, for example, "a", "an" and "the" are added in the English translation, these articles may also indicate plural forms of words, unless the context clearly indicates otherwise.

(16) In this disclosure, the phrase "A and B are different" may mean "A and B are different from each other". The phrase "A and B are different from C, respectively" may mean that "A and B are different from C". Terms such as "separated" and "combined" may be interpreted in the same way as "different".

(17) The examples and embodiments illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiments described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS

10 . . . System
100 . . . Information processing apparatus
110 . . . Processor
120, 120a, 120b, 120c, 120d, 120e . . . Hint provider
130 . . . File acquirer
132 . . . Estimation model acquirer
140 . . . Log acquirer
142 . . . First estimation model
144 . . . Second estimation model
146, 147 . . . Finder
148, 149 . . . Hint display controller
150 . . . Estimation model learner
152, 153 . . . Detector
154 . . . Non-display controller
156 . . . Information transferer
160 . . . Memory
162 . . . Storage
170 . . . Communication apparatus
180 . . . Input device
190 . . . Output device
200 . . . Server apparatus
210 . . . Processor
220, 220a . . . Estimation model generator
260 . . . Memory
270 . . . Communication apparatus.

The invention claimed is:

1. An information processing apparatus comprising:
a log acquirer configured to acquire a log at occurrence of a predetermined event, wherein the log including one or both of a user's input operation history and an application history;
a first estimation model configured to calculate, based on the input log, a first evaluation value for each of a plurality of hint items that are obtained by separating a plurality of hints into categories, wherein each of the plurality of hints being prepared as a usage hint for the user, and wherein the first evaluation value representing likelihood of each of the plurality of hint items being a hint item that includes a hint sought by the user;
a finder configured to find, from among the plurality of hint items, one or more hint items, in each of which the first evaluation value is a first predetermined value or greater; and
a hint display controller configured to display, on a display device, from among the plurality of hint items, the one or more hint items, in each of which the first evaluation value is the first predetermined value or greater.

2. The information processing apparatus according to claim 1, further comprising a second estimation model, wherein the second estimation model is configured to calculate, based on at least the input log, a second evaluation value for each of a plurality of sub-items that are obtained by further separating each of the plurality of hint items into categories,
wherein the second evaluation value represents a likelihood of each of the plurality of sub-items being a sub-item that includes the hint sought by the user, and
wherein if at least one hint item is selected by the user from among the one or more hint items displayed on the display device, the hint display controller is configured to display, on the display device, based on the second evaluation value, one or more sub-items that are included in the at least one hint item selected by the user.

3. The information processing apparatus according to claim 2, further comprising a detector,
wherein the detector is configured to detect (i) a hint that satisfies a first display condition, and (ii) a hint that satisfies a second display condition,
wherein the first display condition being defined for each of the plurality of hints in advance, wherein the second display condition being looser than the first display condition,
wherein the second estimation model is configured to calculate the second evaluation value of a sub-item linked with the hint that satisfies the second display condition,
wherein if the second evaluation value of the sub-item linked with the hint that satisfies the second display condition is a third predetermined value or greater, the hint display controller is configured to display, on the display device, the hint that satisfies the second display condition, and
wherein if the hint that satisfies the first display condition is detected, the hint display controller is configured to display, on the display device, the hint that satisfies the first display condition.

4. The information processing apparatus according to claim 2, further comprising a detector,
wherein the detector is configured to detect a hint that satisfies a first display condition,
wherein the first display condition being defined for each of the plurality of hints in advance, and
wherein the hint display controller is configured to display, on the display device, the hint that satisfies the first display condition, if the hint that satisfies the first display condition is detected.

5. The information processing apparatus according to claim 2,
wherein the finder is configured to find, from among the plurality of hint items, a hint item in which the first evaluation value is a second predetermined value or greater,
wherein the second predetermined value being greater than the first predetermined value,
wherein the second estimation model is configured to calculate the second evaluation value of a plurality of sub-items, which are included in the hint item in which the first evaluation value is the second predetermined value or greater,
wherein if there is the hint item in which the first evaluation value is the second predetermined value or greater,
wherein the hint display controller is configured to display, on the display device, in order from highest to lowest of the second evaluation value, the plurality of sub-items, which are included in the hint item in which the first evaluation value is the second predetermined value or greater, without displaying on the display device the one or more hint items, in each of which the first evaluation value is the first predetermined value or greater.

6. The information processing apparatus according to claim 5, further comprising a detector,
wherein the detector is configured to detect a hint that satisfies a first display condition,
wherein the first display condition being defined for each of the plurality of hints in advance, and
wherein the hint display controller is configured to display, on the display device, the hint that satisfies the first display condition, if the hint that satisfies the first display condition is detected.

7. The information processing apparatus according to claim 5, further comprising a detector,
wherein the detector is configured to detect (i) a hint that satisfies a first display condition, and (ii) a hint that satisfies a second display condition,
wherein the first display condition being defined for each of the plurality of hints in advance, wherein the second display condition being looser than the first display condition,
wherein the second estimation model is configured to calculate the second evaluation value of a sub-item linked with the hint that satisfies the second display condition,
wherein if the second evaluation value of the sub-item linked with the hint that satisfies the second display condition is a third predetermined value or greater, the hint display controller is configured to display, on the display device, the hint that satisfies the second display condition, and
wherein if the hint that satisfies the first display condition is detected, the hint display controller is configured to display, on the display device, the hint that satisfies the first display condition.

8. The information processing apparatus according to claim 1, further comprising a detector,
wherein the detector is configured to detect a hint that satisfies a first display condition,
wherein the first display condition being defined for each of the plurality of hints in advance, and
wherein the hint display controller is configured to display, on the display device, the hint that satisfies the first display condition, if the hint that satisfies the first display condition is detected.

9. The information processing apparatus according to claim 1, further comprising a learner configured to reflect, in the first estimation model, a result of the user's input operation to the one or more hint items displayed on the display device.

10. The information processing apparatus according to claim 1, further comprising a non-display controller configured to stop displaying a hint which the number of times of displaying exceeds a predetermined upper limit.

11. The information processing apparatus according to claim 1, further comprising a model acquirer configured to acquire the first estimation model from a server apparatus that generates the first estimation model.

12. The information processing apparatus according to claim 11, further comprising an information transferer configured to transfer to the server apparatus feedback information indicative of a result of the user's input operation to the one or more hint items displayed on the display device.

13. A hint provision method implemented by an information processing apparatus, comprising:
acquiring a log at occurrence of a predetermined event, wherein the log including one or both of a user's input operation history and an application history;
calculating, based on the input log, a first evaluation value for each of a plurality of hint items that are obtained by separating a plurality of hints into categories, wherein each of the plurality of hints being prepared as a usage hint for the user, and wherein the first evaluation value representing likelihood of each of the plurality of hint items being a hint item that includes a hint sought by the user;
finding, from among the plurality of hint items, one or more hint items, in each of which the first evaluation value is a first predetermined value or greater; and
displaying, on a display device, from among the plurality of hint items, the one or more hint items, in each of which the first evaluation value is the first predetermined value or greater.

* * * * *